United States Patent [19]

Yanagawa et al.

[11] Patent Number: 5,033,811
[45] Date of Patent: Jul. 23, 1991

[54] OPTICAL SWITCH

[75] Inventors: Hisaharu Yanagawa; Yoshiyuki Kamata; Ken Ueki; Hidehisa Miyazawa, all of Tokyo, Japan

[73] Assignee: The Furukawa Electric Co., Ltd., Tokyo, Japan

[21] Appl. No.: 428,929

[22] Filed: Oct. 30, 1989

[30] Foreign Application Priority Data

| Nov. 4, 1988 | [JP] | Japan | 63-277473 |
| May 23, 1989 | [JP] | Japan | 1-127884 |
| Jul. 14, 1989 | [JP] | Japan | 1-180427 |
| Sep. 5, 1989 | [JP] | Japan | 1-228326 |
| Sep. 8, 1989 | [JP] | Japan | 1-233502 |

[51] Int. Cl.$^5$ ............................................. G02F 1/29
[52] U.S. Cl. ............................... 350/96.13; 350/96.14
[58] Field of Search ............... 350/96.12, 96.13, 96.14, 350/96.15

[56] References Cited

U.S. PATENT DOCUMENTS

| 4,521,069 | 6/1985 | Ikeda | 350/96.13 |
| 4,778,235 | 10/1988 | Fujiwara | 350/96.13 |
| 4,784,451 | 11/1988 | Nakamura et al. | 350/96.14 |
| 4,795,225 | 1/1989 | Sakai et al. | 350/96.13 |
| 4,813,757 | 3/1989 | Sakano et al. | 350/96.14 |
| 4,832,430 | 5/1989 | Tada et al. | 350/96.14 |
| 4,840,446 | 6/1989 | Nakamura et al. | 350/96.13 |

OTHER PUBLICATIONS

IEEE/OSA Journal, Polarization-and Wavelength-Insensitive Guided-Wave Optical Switch with Semiconductor Y Junction, Journal of Lightwave Technology, vol. 8 No. 8, Aug. 1990 Hisaharu Yanagawa, Ken Ueki, and Yoshiyuki Kamata, pp. 1192–1197.

Primary Examiner—John D. Lee
Attorney, Agent, or Firm—Frishauf, Holtz, Goodman & Woodward

[57] ABSTRACT

An optical switch includes at least one input optical semi-conductor waveguide. Two output optical semiconductor waveguides are connected at a branch point to the input optical waveguide, and diverge from the branch point with a preset angle $\theta$ (degree) between them. A refractive index controlling portion is located on at least one of the output optical waveguides and away from the branch point. The refractive index controlling portion effects a light mode cut-off by electromagnetically causing a reduction of the refractive index of the associated output optical waveguide.

6 Claims, 17 Drawing Sheets

Fig. 5
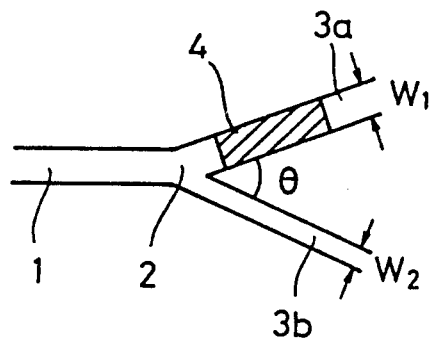
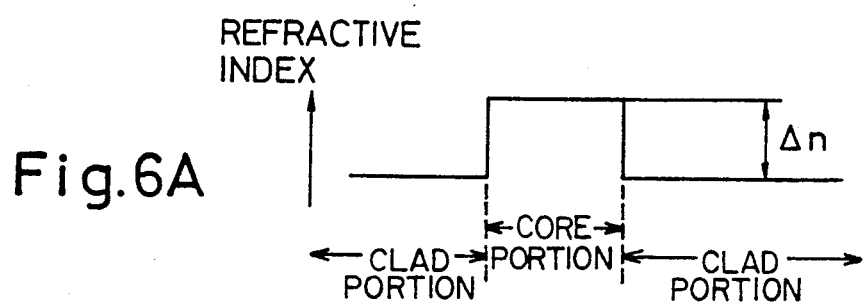
Fig.6A
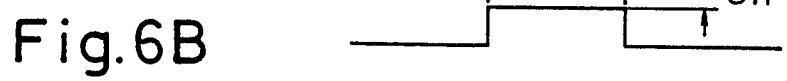
Fig.6B
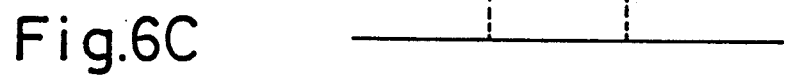
Fig.6C
Fig.6D

OPTICAL SWITCH

BACKGROUND OF THE INVENTION

1. Field of the Invention

This invention relates to an optical switch used for switching optical path lines in an optical communication system, and more particularly, to a semiconductor waveguide optical switch having a switching speed of the order of nanosecond.

2. Description of the Related Art

In an optical communication network utilizing optical fibers, the reliability and the economy thereof cannot be fully enhanced by simply connecting two distant places by means of the optical fibers. Therefore, in order to further enhance the reliability and economy, attempts have been made to improve the availability of the optical fibers by providing an optical switch or switches in the optical fibers to switch optical information to a standby line so as to detour obstacles or switch optical information to an unused line.

As the optical switch used in such an optical communication system, a mechanical type optical switch for switching the optical paths by mechanically moving the optical parts such as the optical fibers has been put into practical use. However, this type of optical switch has an inevitable problem that switching speed thereof is low and is of the order of millisecond (ms) and the number of switching times is limited by wear of the parts caused by the mechanical switching operations.

For the reasons described above, a semiconductor waveguide optical switch has been developed as an optical switch which theoretically has a switching speed of the order of nanosecond (ns) and is free from wear.

An optical switch having an X-junction optical waveguide shown in FIG. 1 is known in the prior art.

As shown in FIG. 1, thin semiconductor layers of a predetermined composition are sequentially laminated as a lower clad layer, a core layer and an upper clad layer on a semiconductor substrate 51 to form optical waveguides 52 and 53 in a ridge configuration. The optical waveguides 52 and 53 intersect each other in the shape of letter "X" with a branch angle $\theta°$ to form a junction point or branch point 54. The entire surface of the structure is covered with a thin insulation film.

That part of the thin insulation film which lies on the central portion of the branch point 54 is removed to form a narrow slit-like window (not shown) extending in a direction in which the optical waveguides are formed. For example, an adequate material is vapcuum evaporated on the upper clad layer via the window to form an electrode 55. The electrode 55 is used to inject a current of a predetermined value to the optical waveguides which intersect at the branch point 54.

Portions 52a and 53a of the optical waveguides 52 and 53 which lie on one side of the optical waveguides with respect to the branch point 54 constitute input ports, respectively, and the other side portions 52b and 53b thereof constitute output ports, respectively.

With the optical switch of the above construction, when a predetermined amount of current is injected via the electrode 55, the refractive index of that portion of the core layer which corresponds to the window and into which the current is injected is lowered by the action of the injected carriers. As a result, light waves incident on the input port 53a are subjected to total reflection at the interface between the current injection area and the non-injection area and then transmitted from the output port 52b to the exterior. On the other hand, when no current is injected via the electrode 55, light waves incident on the input port 53a straightly pass through the branch point 54 and are transmitted from the output port 53b to the exterior.

That is, the light waves incident on the input port 53a are transmitted out from the output port 52b or 53b depending on whether a current is injected via the electrode 55 or not. In this way, the optical switch of FIG. 1 performs the switching operation.

The current switching characteristic of the optical switch is shown in FIG. 2. FIG. 2 shows the output states of light from the output ports 52b and 53b when the current is injected via the electrode 55 while the light waves are incident to the input port 53a.

As is clearly seen from FIG. 2, the light outputs from the output ports 53b and 52b are respectively "1" and "0" when an injected current is 0. On the other hand, when the injected current is larger than a predetermined value (Isw in FIG. 2), the light outputs from the output ports 53b and 52b are changed to "0" and "1", respectively. That is, Isw is a threshold value for the light output. This type of optical switch is called a digital optical switch because of the nature of the response.

The injection current Isw may be influenced by the wavelength dependency of the optical switch. However, if the injection current is set to the maximum permissible value (Imax: Imax ≧ Isw) which can be used in the operable condition of the optical switch, the optical switch will correctly perform the switching function of outputting "0" or "1" in all the operating conditions thereof according to whether the current Imax is injected via the electrode 55 or not. That is, when a current of Imax or more is injected, the wavelength dependency of this type optical switch can be eliminated.

This type of optical switch, that is, a digital switch, has the advantages over a waveguide optical switch utilizing the interference mode as will be described later that the switching operation can be attained simply by changing the refractive index of the optical waveguide according to the current injection and the wavelength dependency thereof can be eliminated. Further, it is possible to combine a plurality of the optical switches each having the X-junction optical waveguide so as to constitute an N×N exchange optical switch.

However, in order to operate this type of optical switch in an ideal manner, it is necessary to form the light reflection surface at exactly the central position of the branch point 54 at the time of current injection. In order to meet this requirement, it is necessary to form the slit-shaped window in exactly the right portion of the branch point 54 and form the slit with the precisely determined shape and dimensions.

However, at present, it is extremely difficult to form the slit-shaped window with such a high precision in the branch point 54 and the window will be formed in a position deviated in a right or left direction from the desired position of the branch point 54 although slightly.

With the deviation of the slit-shaped window in a right or left direction, the light reflection surface is accordingly deviated and therefore the optical switching characteristics will be degraded. In particular, in the case of a single mode device, the total width of the optical waveguide is approx. 10 μm and therefore the deviation of the light reflection surface in a right or left direction develops into a serious problem.

Further, since the width of the slit-shaped window in the width direction of the optical path cannot be increased beyond a certain extent, the thickness of the light reflection surface portion formed by injecting a current via the window cannot be increased. As a result, light waves which should be fully reflected on the light reflection surface may pass through the light reflection surface, causing a problem that an excellent extinction ratio cannot be obtained.

A branching interference type modulator shown in FIG. 3 is known as another example of the optical switch. The modulator is constituted by a combination of Y-junction optical waveguides of the type shown in FIG. 4. As shown in FIG. 4, each of the Y-junction optical waveguides is constructed by sequentially laminating thin semiconductor layers of a predetermined composition as a lower clad layer, a core layer and an upper clad layer on a semiconductor substrate 61 to form an optical waveguide 62. The optical waveguide 62 includes a main optical waveguide 62a as an input port for light waves and two output optical waveguides 62b and 62c branching from the main optical waveguide 62 at a predetermined branch angle θ.

Assume that the cross sections of the main optical waveguide 62a and the output optical waveguides 62b and 62c are the same. Then, the light waves incident on the main optical waveguide 62a are transmitted outwardly from the output optical waveguides 62b and 62c as light waves of the equal light outputs. More specifically, the light waves of the light output "1" incident on the main optical waveguide 62a are equally divided and then transmitted out from the output optical waveguides 62b and 62c as light waves of light output "0.5".

The construction of the branching interference type modulator constituted by a combination of the Y-junction optical waveguides is shown in FIG. 3. That is, the output optical waveguides 62b and 62c of one Y-junction optical waveguide are respectively connected to the input optical waveguides 62b' and 62c' of the other Y-junction optical waveguide, and electrodes 63a and 63b are respectively formed on the connecting portions of the waveguides. A predetermined voltage can be applied to the electrodes 63a and 63b. With the modulator, light waves incident on the main optical waveguide 62a are equally divided by the output optical waveguides 62b and 62c. In this case, for example, since the guided light propagating from the output optical waveguide 62c to the optical waveguide 62c' is subjected to the phase shift according to the voltage applied via the electrode 63a, the guided light is combined or interfered with the guided light propagating from the output optical waveguide 62b to the optical waveguide 62b'. As a result, the light output of the light wave transmitted out from the main optical waveguide 62a' varies according to the phase difference between the guided light propagating through the optical waveguide path 62c-62c' and the guided light propagating through the optical waveguide path 62b-62b'.

In the case of the branching interference type modulator, the mode interference of the light waves propagating through the optical paths is utilized. For this reason, the light output of the light waves to be transmitted is dependent on the polarization and wavelength of the light waves to be propagated. Accordingly, this type modulator can be properly operated only for the guided light of a specified polarization and a specified wavelength.

Besides the X-junction optical switch based on total internal reflection as shown in FIG. 1, another type of digital optical switch is also disclosed by Y. Silberberg, et al. in "Digital Optical Switch" in 11th Conference on Optical Fiber Communication (paper No. THA3). Their switch disclosed utilizes a lithium niobate waveguide as a substrate material, and its operation principle is based on "mode evolution". The mode evolution is the phenomenon that the light wave incident on the junction is transmitted only to the output optical waveguide whose propagation constant is larger than that of the other output optical waveguide. This phenomenon was first reported by H. Yajima in the article of Applied Physics Letters (vol. 12, pp. 647-649, 1973) "Dielectric Thin Film Optical Branching Waveguide" and it was applied to the optical modulation by W. K. Burns, et al. who wrote the article entitled "Active Branching Waveguide Modulator", pp. 790-792 of the volume 22 issue of Applied Physics Letters. Y. Silberberg, et al. used this phenomenon to achieve polarization and wavelength insensitive switching with a help of digital response.

The lithium niobate digital optical switch, however, has two main drawbacks. First, the device is large in length. This is because the linear electrooptic effect can induce a refractive index difference as small as $10^{-4}$. A typical electrode length is more than 10 mm. Secondly, a polarization independence is achieved at the cost of applied voltage. In the case of the lithium niobate, a polarization independent optical switch requires a voltage three times higher than that for a polarization dependent counterpart. This is because the linear electrooptic effect is anisotropic, that is, its magnitude depends on the direction of applied electric field and orientation of crystal.

OBJECTS AND SUMMARY OF THE INVENTION

An object of this invention is to provide a semiconductor waveguide optical switch in which the switching operation is not mechanically effected and therefore wear is not caused by the switching operation and the switching speed is high.

Another object of this invention is to provide a semiconductor waveguide optical switch in which it is not necessary to form a window for current injection or voltage application on the branch point of the optical waveguides with high precision and therefore the manufacturing process can be made simple.

Still another object of this invention is to provide a semiconductor waveguide optical switch whose switching characteristics are free from the polarization dependency and wavelength dependency.

Another object of this invention is to provide a semiconductor waveguide optical switch whose device length is substantially shorter than a lithium niobate digital optical switch.

Another object of this invention is to provide a semiconductor waveguide optical switch which exhibits a digital response using a physical effect other than the total internal reflection and mode evolution.

Another object of this invention is to provide a semiconductor waveguide optical switch in which degradation in the extinction ratio and increase in the excessive loss can be suppressed without increasing the entire length of the element.

In order to achieve the above objects, in an optical switch of this invention, two output optical semiconductor waveguides which make a predetermined angle $\theta$ (degree) are connected at the branch point thereof to at least one input optical semiconductor waveguide. Refractive index controlling means for electrically reducing the refractive index of the output optical waveguide is disposed in a position of at least one of the output optical waveguides and apart from the branch point.

The refractive index controlling means includes an electrode disposed on at least one of the output optical waveguides and a current is injected via the electrode or a voltage is applied via the electrode to make the two output optical waveguides electromagnetically asymmetrical.

Preferably, light attenuation means is disposed between the two output optical waveguides to prevent radiation mode light which has leaked from a portion near the branch point to the exterior of the optical waveguide from being re-combined with the guided mode light in the optical waveguide. Light absorbing means for absorbing the leaked radiation mode light or light scattering means for scattering the leaked radiation mode light may be used as the light attenuation means.

Further, a distance between the physical branch point of the two output optical waveguides and the output end of the refractive index controlling means is preferably set to be not less than $100 \times \theta/\cos(\theta/2)$ μm.

A distance between the closest portions of the refractive index controlling means of the respective output optical waveguides is preferably set to a value smaller than twice the spot size which is defined as half a distance indicated by a light intensity distribution curve representing the light intensity distribution along the cross section of an optical path of the output optical waveguide, the distance being defined by two points on the light intensity distribution curve at which the light intensity is reduced to $1/e^2$ (e is the base of the natural logarithms) times the peak value thereof.

The optical switch of this invention can be applied to the Y-junction type and the X-junction type, and the refractive index controlling means may be disposed in each branch path or disposed in selected two of the branch paths. In the case of the X-junction optical switch, four branch paths are divided into groups of branch paths which make an angle of $(180° - \theta°)$ and the refractive index controlling means is suitably disposed on each branch path of a selected one of the branch path groups.

The above and other objects, features and advantages of this invention may be fully understood from the following detail explanation based on the accompanying drawings.

BRIEF DESCRIPTION OF THE DRAWINGS

FIG. 5 is a plan view showing a Y-junction optical switch according to this invention;

FIGS. 6A to 6D are diagrams showing the cut-off states of the guided mode which are set according to variation in the refractive index of the optical switch of this invention;

DETAILED DESCRIPTION OF THE PREFERRED EMBODIMENTS

In addition to the hints obtained from the prior art described previously, this invention was done by taking account of the fact that a magnitude of inducible refractive index change by current injection or quantum confined stark effect in semiconductor can reach as high as 1%. This is almost two orders of magnitude larger than that of linear electrooptic effect. This fact implies first that a device length of semiconductor optical switch can be shortened substantially as compared with a lithium niobate switch with linear electrooptic effect. It also implies that a new effect other than mode evolution, that is, mode cut-off in a waveguide junction can be used to achieve a digital response which will be described in detail later. Furthermore, refractive index reduction caused by current injection is isotropic, so its magnitude is polarization independent. Therefore, its switching operation is polarization independent by nature even without a help of digital response. Consequently, there is no degradation due to making a switching operation polarization independent, unlike a lithium niobate switch.

This invention has been made in view of the background described above, and in the optical switch of this invention, an electrode is disposed on one of or both of the output optical waveguides instead of disposing the electrode on the branch point of the optical waveguide and the electrode or electrodes are activated to make the two output optical waveguides optically asymmetrical, thus performing the switching operation.

Figure 1:
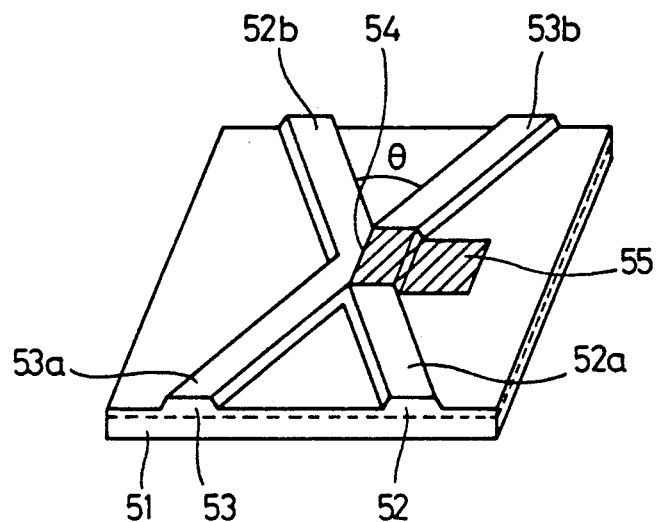
FIG. 1 is a schematic perspective view of the conventional X-junction guided-wave optical switch.
Figure 2:
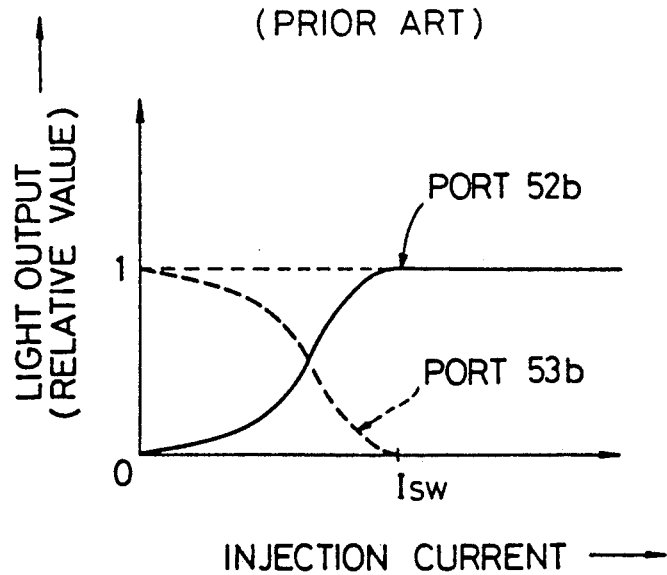
FIG. 2 is a switching characteristic diagram of the optical switch shown in FIG. 1.
Figure 3:
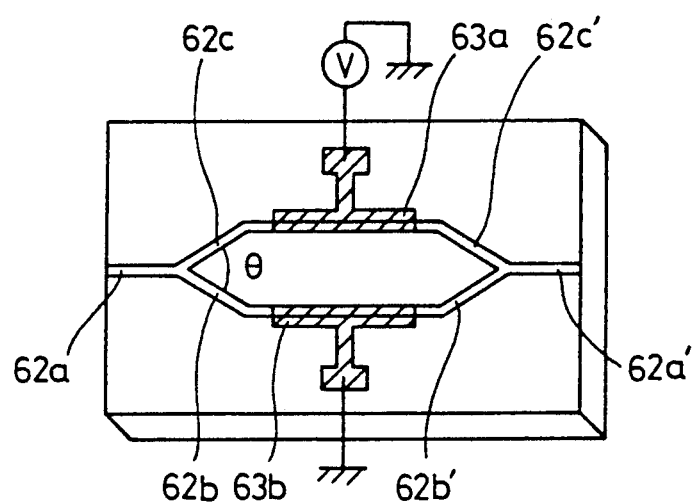
FIG. 3 is a schematic plan view showing the conventional branching interference type modulator.
Figure 4:
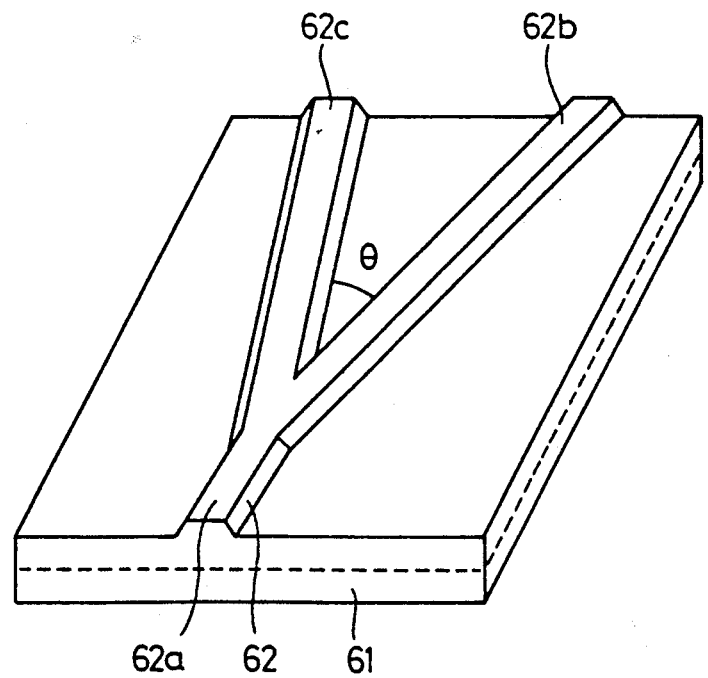
FIG. 4 is a schematic perspective view of a Y-junction optical waveguide used in the modulator shown in FIG. 3.

In this case, the electrode is formed only to make the refractive index of one of the output optical waveguides smaller than that of the other optical waveguide. Therefore, the electrode may be formed with an adequate length and width (shape) on the upper surface of the output optical waveguide, and it is not necessary to form the electrode with such a high precision as required in the case of forming the total reflection surface shown in FIG. 1. As a result, formation of the electrode becomes extremely simple in comparison with the prior art case.

FIG. 5 is a plan view of a Y-branching ridge type optical waveguide of this invention. An optical switch having the above optical waveguide is constructed by, for example, forming a GaAs semiconductor substrate with a thickness of 150 $\mu$m on a lower electrode of AuGeNi/Au with a thickness of 0.25 $\mu$m, forming an n+Al$_{0.1}$Ga$_{0.9}$As semiconductor layer with a thickness of 5 $\mu$m as a lower clad layer on the semiconductor substrate, forming an n−GaAs semiconductor layer with a thickness of 1 $\mu$m as a core layer on the lower clad layer, and then forming a p+Al$_{0.1}$Ga$_{0.9}$As semiconductor layer with a thickness of 1.5 $\mu$m as an upper clad layer on the core layer.

In FIG. 5, the main optical waveguide 1 is used as an input port and branched at the branch point 2 into the output optical waveguides 3a and 3b to form a Y-junction. The branch angle $\theta$ of the Y-junction is set to be not greater than 3°, for example, to an angle as small as 2°.

Provided that the relative differences in specific refractive index of the core/clad of the output optical waveguides 3a and 3b are $\Delta_1$ and $\Delta_2$ and the core widths thereof are $w_1$ and $w_2$, then $\Delta_1 = \Delta_2$ and $w_1 > w_2$. Therefore, the propagation constant $\beta_1$ of the output optical waveguide 3a becomes larger than the propagation constant $\beta_2$ of the output optical waveguide 3b and the output port sides become electromagnetically asymmetrical.

A current injection electrode 4 is formed on the output optical waveguide 3a having the propagation constant $\beta_1$. The electrode 4 may be formed by depositing Cr/Au to a thickness of approx. 0.25 $\mu$m by the vacuum evaporation method, for example.

As shown in FIG. 5, the electrode 4 is formed to cover the upper surface of a portion of a predetermined length of the output optical waveguide 3a. However, the electrode 4 is not necessarily formed on the entire upper surface area of the optical waveguide 3a but may be formed only on a partial upper surface area thereof.

When light waves are incident on the main optical waveguide 1 with no current injected via the electrode 4, the light waves will be transmitted out only from the output optical waveguide 3a having a larger propagation constant since the output optical waveguides 3a and 3b are set asymmetrical. If, in this condition, a current is injected via the electrode 4 to reduce the refractive index of the current injected portion of the output optical waveguide 3a by $\delta$n so as to set up the relation of $\Delta_1 - \delta < < \Delta_2$ between the output optical waveguides 3a and 3b, then the relation of $\beta_1 < \beta_2$ can be obtained. When the propagation constant relation between the output optical waveguides is thus reversed, the light waves incident on the main optical waveguide 1 will be transmitted out only from the output optical waveguide 3b whose propagation constant now becomes larger. In this way, an optical switching effect can be obtained.

In this case, it is preferable to set the reduced refractive index $\delta$n to be larger than the specific refractive index difference of the lateral core and clad portions of the optical waveguide on the output port side. If the refractive index is reduced by the value $\delta$n, the light wave propagating in the output optical waveguide can be completely cut off by setting the guided mode to 0. The cut-off of the light wave in the optical switch means that the output optical waveguide physically exists but can be regarded as being not present electromagnetically, that is, having no wave guide action appearing as the result of variation in the refractive index distribution. This is explained by taking the case of current injection as an example with reference to FIG. 6.

There occurs a refractive index difference $\Delta n$ between the waveguide portion (core portion) and the surrounding portion (clad portion) near the cross section of the optical path of the output optical waveguide (FIG. 6A). Assume now that a current $I_1$ is injected into the waveguide portion. Then, the refractive index of the waveguide portion is reduced by $\delta n$ by the current injection. That is, the refractive index difference between the waveguide portion and the surrounding portion becomes $(\Delta n - \delta n)$ (FIG. 6B).

Further, when a larger current $I_2$ ($I_2 > I_1$) is injected, the refractive index of the waveguide portion is further reduced and can be set to ($\delta n = \Delta n$). That is, no refractive index difference occurs between the waveguide portion and the surrounding portion thereof and the wave guide action due to the presence of the refractive index distribution disappears, thereby setting up a condition in which the presence of the waveguide can be substantially disregarded (FIG. 6C).

When the injection current is further increased to $I_3$ ($I_3 > I_2$), the refractive index of the waveguide portion is further decreased and becomes lower than that of the surrounding portion. Also, in this case, a substantial effect of the waveguide disappears (FIG. 6D).

In the optical switch of this invention, the complete cut-off of the guided mode light means that the output optical waveguide is set into the states shown in FIGS. 6C and 6D.

Figure 7:
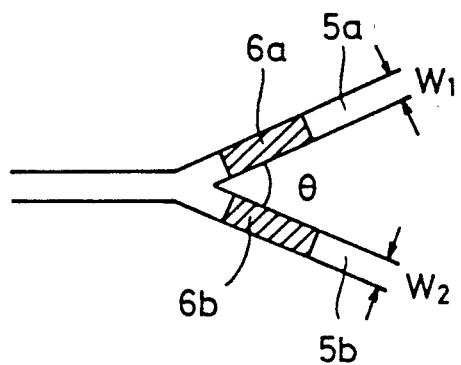
FIG. 7 is a plan view showing another embodiment of a Y-junction optical switch of this invention.

FIG. 7 shows an optical switch according to another embodiment of this invention. In the waveguide of the optical switch, output optical waveguides 5a and 5b on the output port side are formed with the same width w and electrodes 6a and 6b are formed on the respective waveguides. In this embodiment, the output optical waveguides 5a and 5b can be made electromagnetically asymmetrical by injecting a current via one of the electrodes 6a and 6b and the light wave incident on the input port can be selectively transmitted out from one of the output optical waveguides 5a and 5b by selecting one of the electrodes via which the current is injected.

In this type of optical switch, since the waveguides on the output side can be formed with the same width, connection of the optical fibers at the respective end faces may be made simple.

Figure 8:
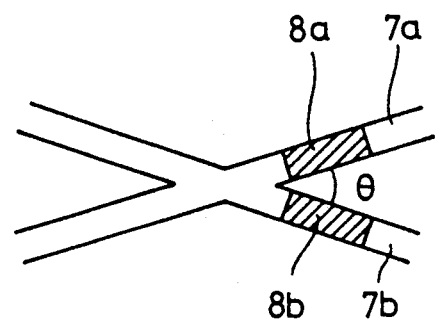
FIG. 8 is a plan view showing an X-junction optical switch of this invention.

An X-junction optical waveguide is explained as an optical switch according to still another embodiment of this invention with reference to FIG. 8.

In this optical waveguide, electrodes 8a and 8b are respectively formed on output optical waveguides 7a and 7b of the same width disposed on the output port. In this embodiment, the waveguides 7a and 7b can be set electromagnetically asymmetrical by controlling the current injection via the electrodes 8a and 8b.

Another X-junction guided-wave optical switch will be explained with reference to FIGS. 9 and 10.

The optical switch is constructed by two optical waveguides which intersect at an angle $\theta°$ to form an X-junction optical waveguide. The optical switch can be regarded as being formed of four branches which are connected together at the intersection. Electrodes 12a, 12b, 13a and 13b are respectively formed on the branches 10a, 10b, 11a and 11b. In this case, a pair of branches 10a and 11b and a pair of branches 11a and 10b individually form an intersection angle of $(180° - \theta°)$.

Figure 9:
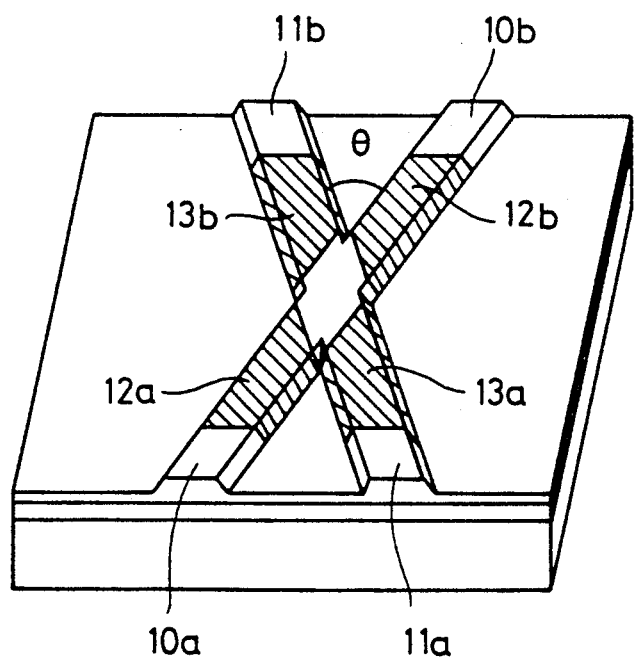
FIG. 9 is a schematic perspective view showing another embodiment of an X-junction optical switch of this invention.

With the optical switch of FIG. 9, the optical waveguides 10a and 11a are used as input ports and the optical waveguides 10b and 11b are used as output optical waveguides if no current is injected or no voltage is applied via the electrodes 12a and 13a. In contrast, if none of the electrodes 12b and 13b is used, the optical waveguides 10b and 11b are used as input ports and the optical waveguides 10a and 11a are used as output optical waveguides.

That is, the optical switch can be used as an optical switch capable of effecting the bi-directional communication.

Figure 10:
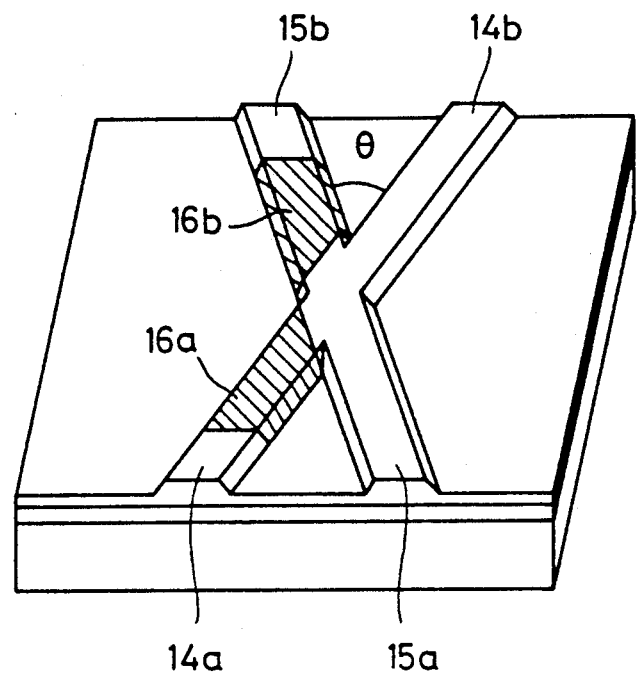
FIG. 10 is a schematic perspective view showing still another embodiment of an X-junction optical switch of this invention.

In the optical switch of FIG. 10, a pair of branches 14a and 15b which, among the branches 14a, 14b, 15a and 15b, make an intersection angle of $(180° - \theta°)$ are provided with electrodes 16a and 16b, respectively.

With the optical switch of FIG. 10, if $\theta$ is smaller than a certain value, for example, greater than 1°, the light wave incident on the branch 14a or 15a is transmitted out equally from both the branch 14b and the branch 15b when no current is injected or no voltage is applied via the electrodes 16a and 16b.

In contrast, if a current is injected or a voltage is applied via each of the electrodes 16a and 16b, propagation of the light wave along the optical waveguides 14a and 15b is completely interrupted, and all the light wave incident on the branch 15a is transmitted out from the branch 14b and all the light wave incident on the branch 14b is transmitted out from the branch 15a.

In this way, the optical switch has a first switching state in which the branches 14a and 15a are respectively connected to it works as a broadcasting switch and a second switching state in which the branch 15a is connected to the branch 14b.

In the optical switch of this invention, a portion of the thin insulation film formed on the surface of the output optical waveguide is removed and metal such as Cr/Au is vacuum evaporated, for example, on the exposed portion to form an upper electrode. In the structure thus obtained, the p-type semiconductor layer, n-type semiconductor layer and lower electrode are arranged in this order under the upper electrode.

In an optical switch of the current injection type, a diode formed of the p- and n-type semiconductor layers may be biased in a forward direction by connecting the upper and lower electrodes respectively to the positive and negative terminals of a power source so that a current can be permitted to flow in the p- and n-type semiconductor layers to inject carriers into a portion near the pn junction thereof, thereby making it possible to reduce the refractive index. The refractive index can be reduced by about 1%. This is almost two orders of magnitude larger than that caused by the linear electrooptic effect which is exploited in the lithium niobate. Furthermore, the refractive index reduction caused by current injection itself is polarization independent. Therefore, the switching operation is polarization independent even without the cost of switching efficiency, as is not the case with a lithium niobate switch.

In an optical switch of the voltage application type, a diode formed of the p- and n-type semiconductor layers may be reversely biased by connecting the upper and lower electrodes to the negative and positive terminals of a power source so that a depletion layer formed near the pn junction between the p- and n-type semiconductor layers may become larger to cause an electric field in the depletion layer, thereby making it possible to increase or decrease the refractive index. Particularly, in the case of a multiple quantum well structure, the refractive index can be varied by about 1%. This is quite large as compared with the value obtained by the linear electrooptic effect.

At this time, the refractive index of the waveguide portion can be controlled by adjusting the amount of injection current or the applied voltage in such a state as shown in FIG. 6.

Figure 11:
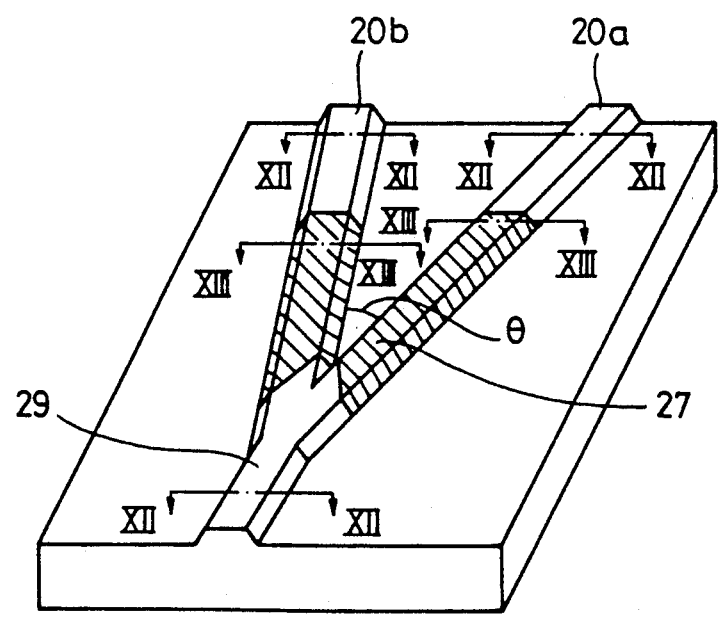
FIG. 11 is a perspective view showing the detail construction of the optical switch of FIG. 7.
Figure 12:
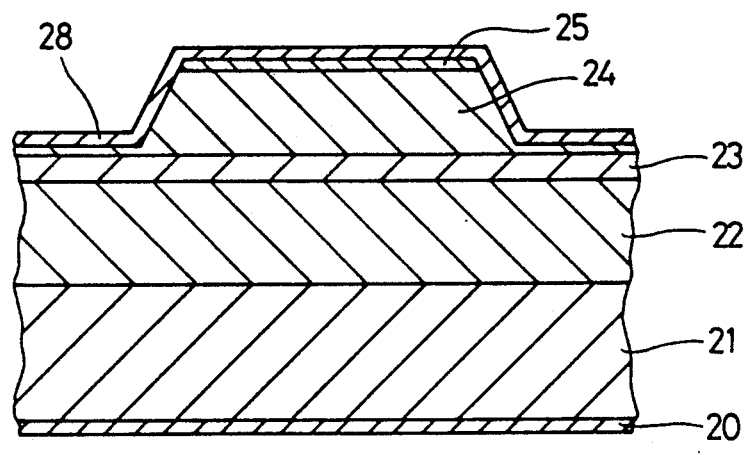
FIG. 12 is a cross sectional view taken along the line XII—XII of FIG. 11.
Figure 13:
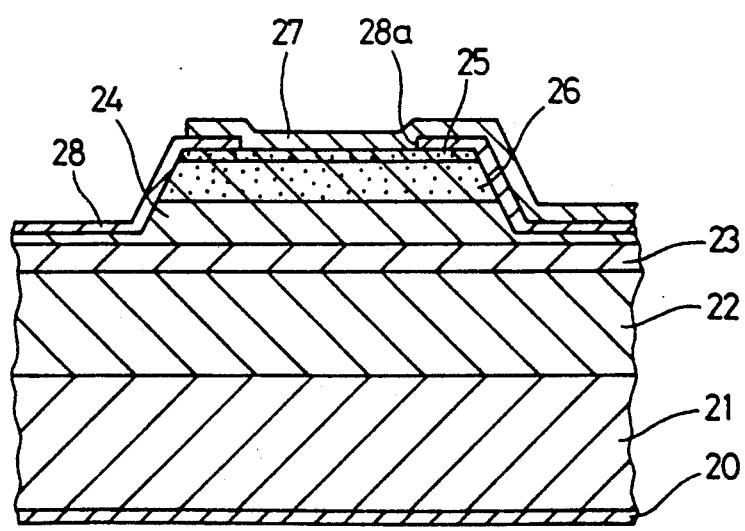
FIG. 13 is a cross sectional view taken along the line XIII—XIII of FIG. 11.

FIGS. 11 to 13 show the detail construction of a symmetrical Y-junction waveguide type optical switch having a current injection electrode.

In the structure of FIG. 11, the electrodes 27 are formed to cover the upper surface of the portions of a certain length of the respective output optical waveguides 20a and 20b. However, the electrodes 27 are not necessarily formed on the entire upper surface of the output optical waveguides 20a and 20b but may be formed only on the partial upper surface thereof. Further, the electrode 27 may be formed only on one of the output optical waveguides 20a and 20b.

FIG. 12 shows the construction of that portion of the main optical waveguide 29 and the output optical waveguides 20a and 20b of the optical switch in which no electrode to be described later is formed. That is, an n+GaAs semiconductor substrate 21 is formed on a lower electrode 20 of AuGeNi/Au, and a lower clad layer 22 of n+AlGaAs semiconductor, a core layer 23 of n−GaAs semiconductor, a ridge-shaped upper clad layer 24 of n−AlGaAs semiconductor and a cap layer 25 of n−GaAs are sequentially laminated on the substrate 21. The entire surface of the structure is covered with a thin insulation film 28 of $SiO_2$.

FIG. 13 shows the construction of the electrode forming portion of the output optical waveguides 20a and 20b. In the electrode forming portion, a portion with an adequate width and length of the thin insulation film 28 is removed to form a window 28a. Zn is diffused into the upper clad layer 24 to a predetermined depth through the window 28a, to form a Zn diffusion region 26, and then a current injection electrode 27 of Cr/Au is formed over the window 28a.

Figure 14:
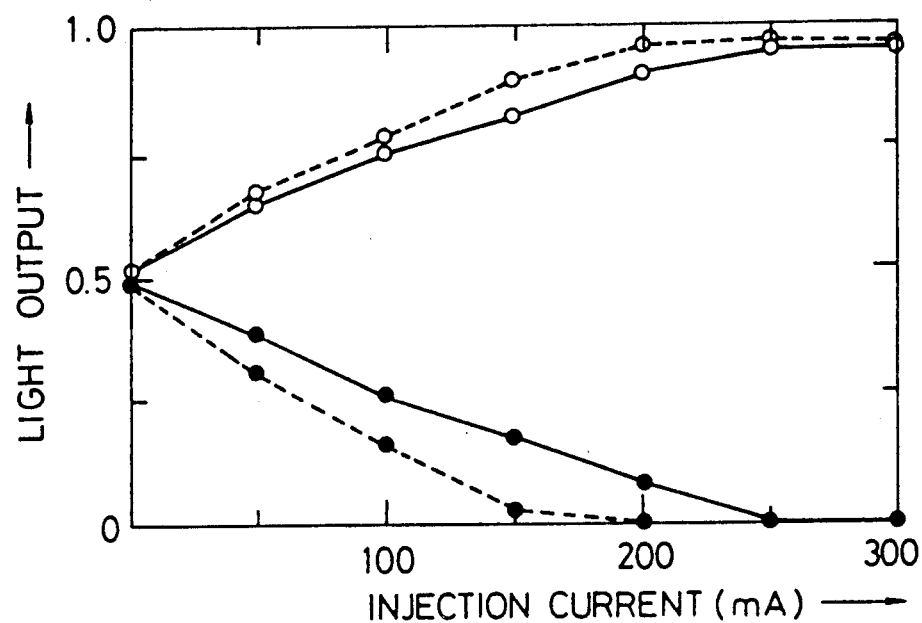
FIG. 14 is a graph showing the injection current-light output characteristics of the optical switch shown in FIG. 11.

The optical switch of the above construction in which the branch angle $\theta$ was set at 2° and the width of the output optical waveguides 20a and 20b was set at 5 $\mu$m was used, and the light output of the light wave transmitted out from the output optical waveguides 20a and 20b was measured while a current to be injected via the electrode 27 was changed with the guided light of the wavelengths of 1.3 $\mu$m and 1.55 $\mu$m incident on the main optical waveguide 29. The measurement result is shown in FIG. 14. In FIG. 14, marks ◯ indicate the state of the output optical waveguide 20a and marks indicate the state of the output optical waveguide 20b. Further, the solid line indicates the case of using the light of the wavelength of 1.3 $\mu$m and the broken lines indicate the case of using the light of the wavelength of 1.55 $\mu$m.

As is clearly seen from FIG. 14, in the above optical switch, the same amount of light is transmitted from the output optical waveguides 20a and 20b with respect to the guided light of the wavelengths of 1.3 to 1.55 $\mu$m when a current injected via the electrode 27 is 0. However, when the injection current becomes larger than 250 mA, switching characteristics of "0" or "1" may be obtained. That is, the Y-junction optical waveguide can be used as an optical switch for the guided light in the wavelength range of 1.3 to 1.55 $\mu$m by setting the injection current at or more than 250 mA. Incidentally, the electrode was only 1 mm long. This device length shorter by an-order-of-magnitude was achieved because of the very large refractive index reduction induced by current injection.

At this time, a slight output loss occurs by the influence of the branch angle $\theta$ when the light wave incident on the input port is transmitted out from one of the output optical waveguides. However, the output loss is small and can be neglected in practical use. For example, when the guided light having the spot size of 4 $\mu$m and the wavelength of 1.55 $\mu$m is propagated in the branch optical waveguide in which the waveguide material is GaAs and the branch angle $\theta$ is 2°, the output loss calculated according to the theory of Beam Propagation Method (BPM) is 0.3 dB. When the branch angle $\theta$ is 3°, the output loss is 1.6 dB, and when the branch angle $\theta$ is 1°, the output loss is less than 0.1 dB.

Also, the polarization dependency of the guided light having the above two wavelengths was checked with the injection current set at 100 mA.

Assume now that three axes which cross one another at right angles are x, y and z axes and the plane wave propagates in a direction along the z axis. Then, the electric field component of the light wave lies in a plane which crosses the propagation direction at right angles or the x-y plane, and the light wave with the electric component parallel to the x axis is called the x-polarized wave and the light wave with the electric component parallel to the y axis is called the y-polarized wave. However, in general, since the electric component of the light wave is parallel to neither the x axis nor the y axis, the polarization dependency can be measured, that is, changes of the output ratio (branching ratio) between the outputs of the two output optical waveguides 20a and 20b can be measured when the directional angle $\alpha$ (°) of the electric field component is changed.

Figure 15:
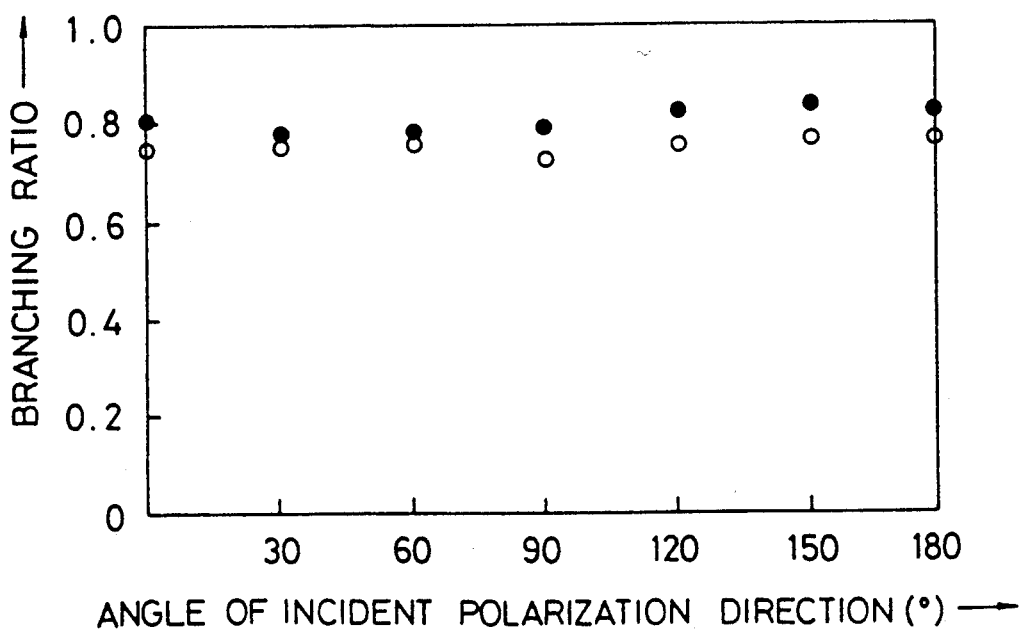
FIG. 15 is a graph showing the incident polarization direction angle and the branching ratio characteristic of the above optical switch.

The measurement result is shown in FIG. 15. In FIG. 15, marks ◯ indicate the case of using the light of the wavelength of 1.3 $\mu$m and marks indicate the case of using the light of the wavelength of 1.55 $\mu$m. As is clearly understood from FIG. 15, the switching characteristics of the Y-junction optical waveguide do not exhibit the polarization dependency.

In the above example, the optical switch is constructed by the symmetrical Y-junction waveguide. However, the optical switch of the other embodiment may be constructed in the same manner as described above. For example, in the asymmetrical Y-junction waveguide of FIG. 5 in which the output optical waveguides have different widths and the X-junction optical waveguide shown in FIG. 8, the optical waveguide may be constructed with the same cross section as explained in the above example.

In a case where a current is injected via the electrode of the optical waveguide, the injection current cannot be infinitely increased. Therefore, in general, the length of the electrode portion is finite and is generally limited to from several hundred $\mu$m to several mm. As a result, that portion of the output optical waveguide which lies on the downstream side of the downstream end of the electrode is always set in the light transmittable state. Therefore, the radiation mode light wave may be recombined with the guided mode light in the output optical waveguide on the downstream of the electrode portion, thereby degrading the extinction ratio.

The extinction ratio means, in the example of FIG. 7, for instance, Lmax/Lmin, where Lmax is the main light output from the waveguide 5a when a current is injected into the electrode 6b, and Lmin is the crosstalk light output from the waveguide 5a when a current is injected into the electrode 6a.

In order to solve the above problem, it is considered that the branch angle θ between the two output optical waveguides is made extremely small so as to suppress generation of the radiation mode light. Alternatively, it is considered that the electrode length is made extremely long such that the light combined with the radiation mode light is attenuated.

However, in the former method, the length of the element is significantly increased, making the whole size of the optical switch larger, and in the latter method, the injection current is increased, thereby increasing the amount of heat generated in the optical waveguide.

For this reason, in the preferred embodiment of this invention, a light attenuator is disposed between the two output optical waveguides of the optical switch to positively attenuate the radiation mode light generated at the Y-junction point or the like, thereby suppressing the recombination of the radiation mode light with the guided mode light. As a result, degradation in the extinction ratio can be suppressed.

In this type of optical switch, the light attenuation section is formed as a light absorbing section which is formed by disposing (laminating) a metal layer on the upper clad layer of the lateral clad portion between the lateral core portion of the output optical waveguides, or a light scattering section having an uneven surface pattern. Since the radiation mode light generated is attenuated by means of the light attenuating section while propagating along the clad portion, recombination with the guided mode light can be suppressed.

Unlike the conventional optical switch, with this type of optical switch having the light attenuating section, it is not necessary to reduce the branch angle θ and increase the element length or increase the electrode length for current injection or voltage application, thereby making it possible to prevent the extinction ratio from being degraded by the radiation mode light.

Figure 16:
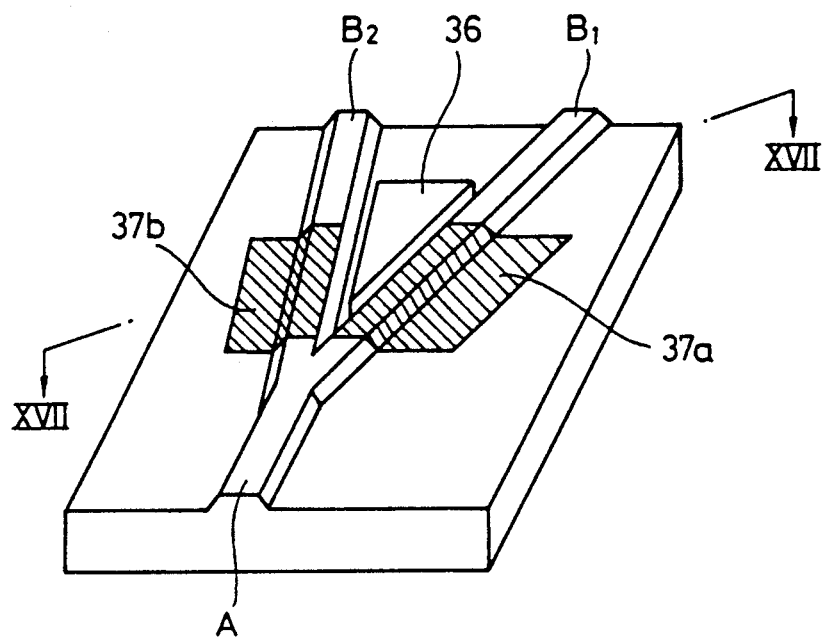
FIG. 16 is a schematic perspective view of a Y-junction optical switch of this invention having the extinction ratio improved.
Figure 17:
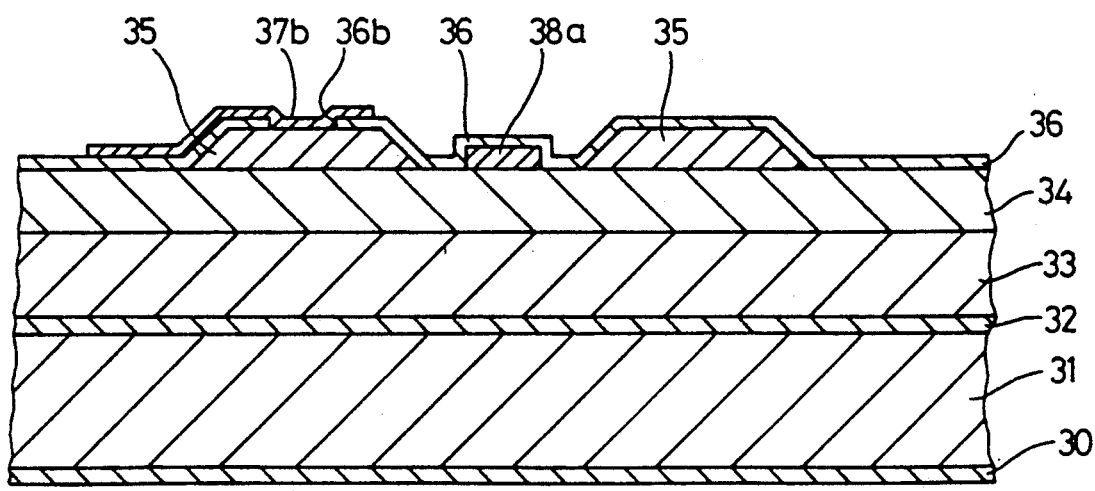
FIG. 17 is a cross sectional view taken along the line XVII—XVII of FIG. 16.

FIGS. 16 and 17 show an optical switch having the light absorbing section as the light attenuating section. In the optical switch, n+-type semiconductor layers 31 and 32 are sequentially formed on a lower electrode 30, and a lower clad layer 33 of n+-type semiconductor and a core layer 34 of n−-type semiconductor are sequentially formed on the semiconductor layer 32.

An upper clad layer 35 of p+-type semiconductor is formed in a ridge form on the core layer 34 to form a Y-junction with a branch angle θ and the upper surface thereof is covered with a thin insulation film 36.

The main optical waveguide A is an input port for the light wave and the output optical waveguides $B_1$ and $B_2$ are output ports for the light waves.

A portion of the thin insulation film 36 is removed in the form of a slit with an adequate width and length so as to form windows (only one of them is shown in FIGS. 16 and 17 as a window 36b) in the output optical waveguides $B_1$ and $B_2$. Upper electrodes 37a and 37b are formed in contact with different portions of the upper clad layer 35 via the respective windows by the vacuum evaporation method, for example.

The optical absorbing section 38a is formed on the surface of a portion of the upper clad layer which lies between the output optical waveguides $B_1$ and $B_2$ branching in a Y-junction form from the main optical waveguide A and extending in a ridge form, and the upper surface thereof is covered with the thin insulation film 36. The light absorbing section 38a is formed to extend from the Y-junction point to the rear or downstream portions of the upper electrodes 37a and 37b.

The light absorbing section 38a can be formed of any material which has a property of absorbing the radiation mode light, and may be formed of a metal layer deposited on a predetermined portion of the upper clad layer 35 by the vacuum evaporation method, for example.

With the above optical switch, since the radiation mode light generated at the Y-junction point or the like can be absorbed by means of the light absorbing section 38a, recombination of the light in the branched optical waveguide $B_1$ or $B_2$ can be suppressed, thereby preventing degradation of the extinction ratio.

Figure 18:
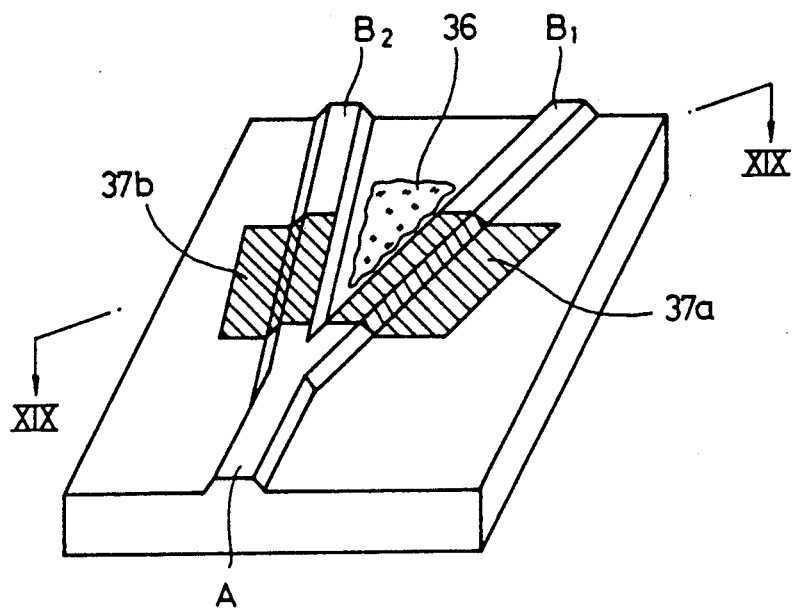
FIG. 18 is a schematic perspective view of a Y-junction optical switch according to another embodiment of this invention and having the extinction ratio improved.
Figure 19:
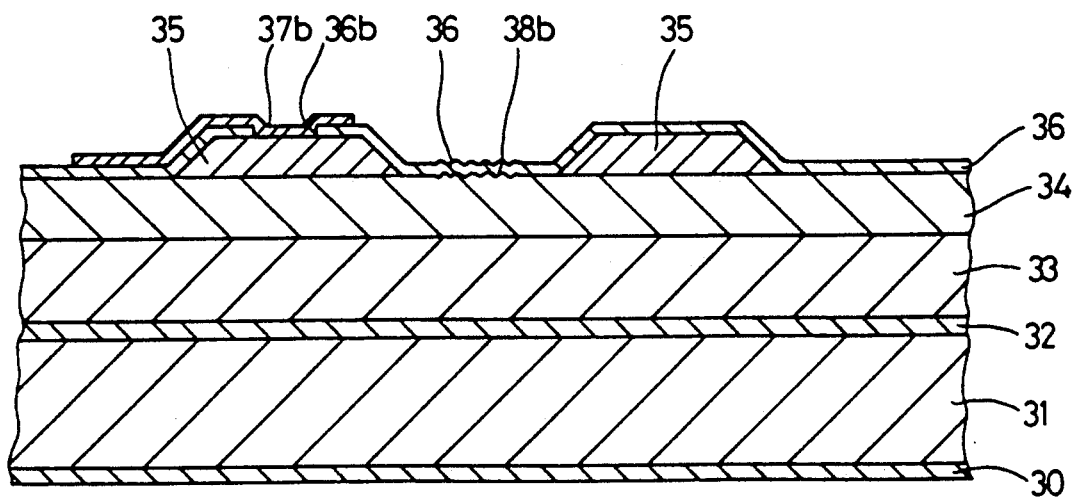
FIG. 19 is a cross sectional view taken along the line XIX—XIX of FIG. 18.

FIGS. 18 and 19 show an optical switch having the light scattering section as the light attenuation section. In this type of optical switch, the light scattering section 38b is formed to extend from the Y-junction to the rear or downstream portion of upper electrodes 37a and 37b on the surface of the upper clad layer 35 of the ridge-shaped output optical waveguides $B_1$ and $B_2$ and the upper surface thereof is covered with a thin insulation film 36.

The light scattering section 38b may be formed by, for example, an uneven surface pattern which can be attained by subjecting the surface of the upper clad layer 35 to the etching process, for example. The uneven surface pattern may be any pattern which can scatter light, and may be formed as a diffraction grating pattern or a random pattern having irregular areas randomly distributed.

With the optical switch of the above construction, since the radiation mode light generated at the Y-junction point or the like is scattered to the exterior by means of the light scattering section and attenuated, recombination of the radiation mode light with the guided mode light can be suppressed, thereby preventing degradation of the extinction ratio.

Figure 20:
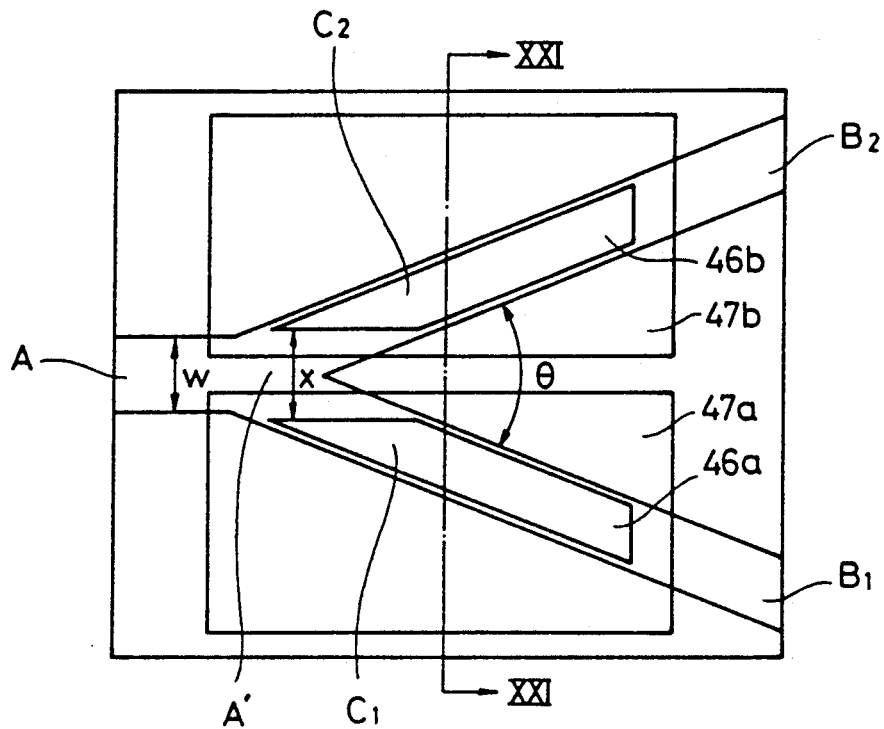
FIG. 20 is a plan view of a Y-junction optical switch according to still another embodiment of this invention and having the extinction ratio and excessive loss improved.
Figure 21:
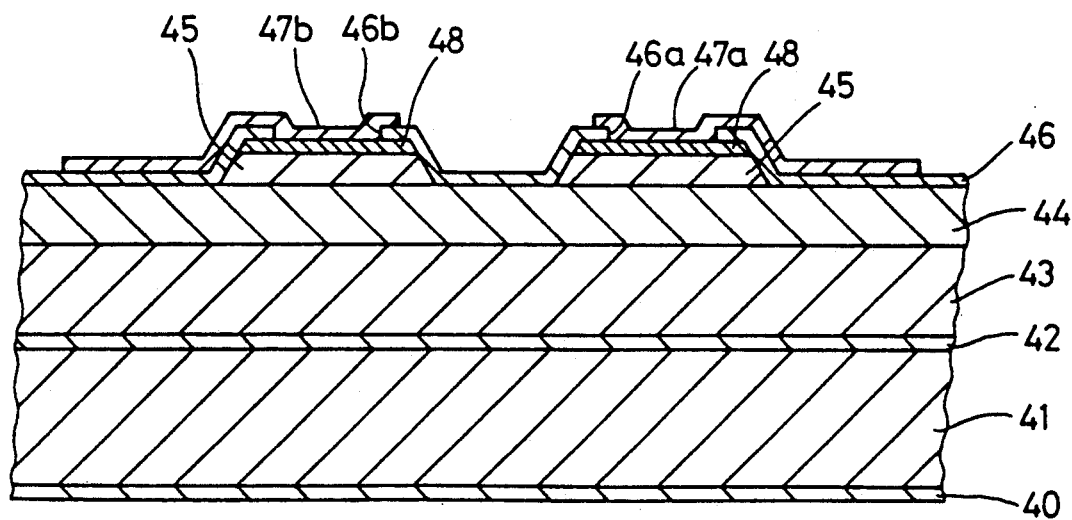
FIG. 21 is a cross sectional view taken along the line XXI—XXI of FIG. 20.

FIGS. 20 and 21 show a Y-junction guided-wave optical switch of another semiconductor structure. In the optical switch shown in FIGS. 20 and 21, n+GaAs semiconductor layers 41 and 42 are sequentially formed on a lower electrode 40, and a lower clad layer 43 of n+Al$_{0.1}$Ga$_{0.9}$As semiconductor and a core layer 44 of an n+GaAs semiconductor layer with a thickness of 1 μm are sequentially laminated on the semiconductor layer 42.

An upper clad layer 45 of p+Al$_{0.1}$Ga$_{0.9}$As semiconductor is formed on the core layer 44 and the upper surface thereof is covered with a thin insulation film 46.

A portion of the upper clad layer 45 is formed in a ridge form with a thickness of 1 μm and a cap layer 48 of p+GaAs semiconductor is formed on the upper surface of the ridge portion of the upper clad layer 45, thus constituting a main optical waveguide A, and output optical waveguides $B_1$ and $B_2$ along the ridge portion.

The optical path width of the main optical waveguide A and output optical waveguides $B_1$ and $B_2$ is set to 6 μm and the branch angle θ between the output optical waveguides $B_1$ and $B_2$ is set at 2°.

A portion of the thin insulation film 46 covering the output optical waveguides $B_1$ and $B_2$ is removed to form windows 46a and 46b having a plane pattern as shown in FIG. 20 on the optical waveguides $B_1$ and $B_2$. Upper electrodes 47a and 47b are formed over the windows to be in contact with the cap layer 48, by vacuum evaporation a suitable electrode material. For example, when a current is injected into the cap layer 48 via the upper electrode 47a or a voltage is applied between the cap layer 48 and the $n^+$-type semiconductor layer 41, the refractive index of a portion of a portion of the output optical waveguide which lies under the window 46a is changed. As a result, all the light wave incident on the main optical waveguide A will be transmitted out from the other output optical waveguide $B_2$. In this way, the optical path can be changed or the optical switching function can be achieved. In this case, portions of the output optical waveguides which correspond in shape to the windows 46a and 46b function as refractive index controlling sections $C_1$ and $C_2$.

In a case where the optical path is changed by means of this type of optical switch, it is preferable to permit the light wave having propagated along the main optical waveguide A to change the propagation direction immediately behind the branch point A' and propagate along the output optical waveguide $B_2$ when the refractive index controlling section $C_1$ is operated, for example.

Figure 22:
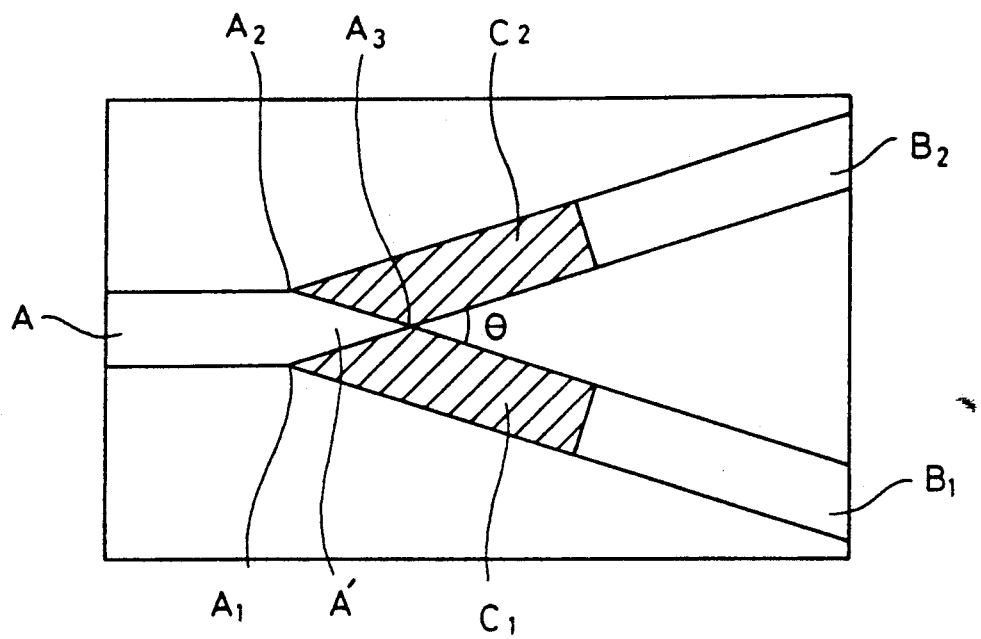
FIG. 22 is a plan view showing the arrangement of a Y-junction optical switch when the refractive index control section of the Y-junction optical switch is formed in the ideal condition.

In order to meet the above requirement, for example, it is ideal to form the end face of the refractive index controlling section $C_1$ near the branch portion A' to be coincident with a plane connecting the branch points $A_1$ and $A_3$, and to form the end face of the refractive index controlling section $C_2$ near the branch portion A' to be coincident with a plane connecting the branch points $A_2$ and $A_3$, as shown in the plan view of FIG. 22.

However, if the refractive index controlling sections $C_1$ and $C_2$ are formed with the above configurations and when the refractive index controlling section $C_1$ is operated to control the refractive index of the output optical waveguide $B_1$, the refractive index controlling section $C_2$ will also be operated since the refractive index controlling sections $C_1$ and $C_2$ are set in contact with each other at the branch point $A_3$. That is, when refractive index controlling sections which are considered ideal are formed as in the optical switch shown in FIG. 22, it becomes impossible to operate the refractive index controlling sections independently from each other, making it impossible to switch the optical paths.

Figure 23:
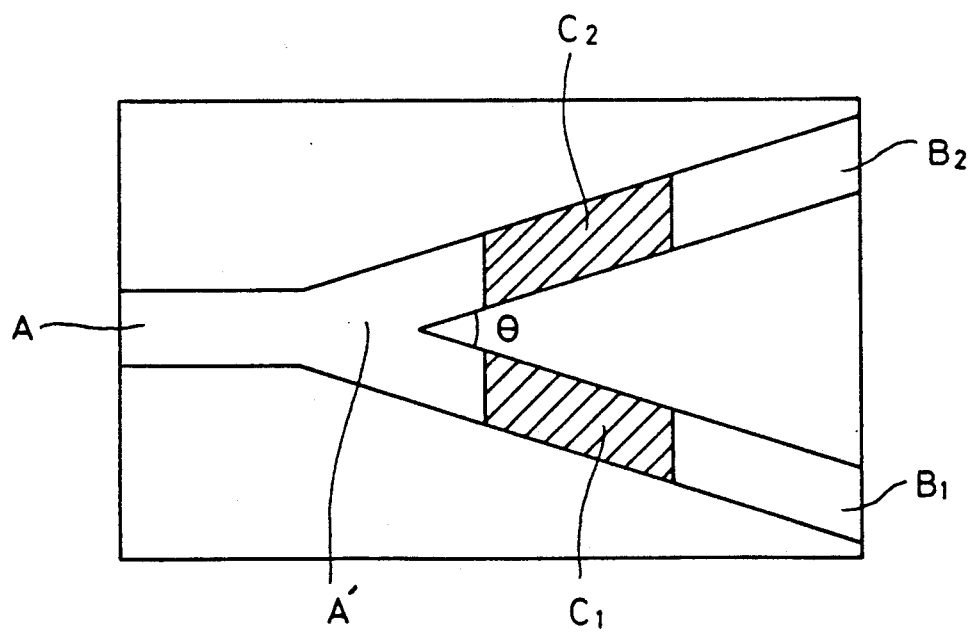
FIG. 23 is a plan view showing the arrangement of the above optical switch when the refractive index control section of the Y-junction optical switch is formed farther from the branch point thereof.

On the other hand, when the end faces of the refractive index controlling sections $C_1$ and $C_2$ on the side of the branch portion A' are formed separately from the branch portion A' in the downstream of the optical paths in the optical switch shown in FIG. 23, that is, when the refractive index controlling sections $C_1$ and $C_2$ are disposed on the downstream side, the problem which has occurred in the optical switch of FIG. 22 will not occur.

However, in this case, a large amount of the light wave having propagated along the main optical waveguide A is distributed at the branch portion A' to the output optical waveguides $B_1$ and $B_2$ and then reach the refractive index controlling sections $C_1$ and $C_2$. Therefore, the radiation mode light significantly increases and is re-combined with the guided mode light to degrade the extinction ratio and increase the loss.

In order to solve the above problem, according to the optical switch of the invention, the distance X (FIG. 20) between the nearest portions of the refractive index controlling sections $C_1$ and $C_2$ is preferably set to be equal to or less than twice the spot size of the light wave which propagates in the output optical waveguide.

In general, as the distance between the two refractive index controlling sections at the branch portion of the Y-junction guided-wave optical switch is set smaller, the degradation degree of the extinction ratio becomes smaller. This is because the propagating direction of the light wave having propagated along the main optical waveguide is controlled by the action of the refractive index controlling sections before it is distributed to the two output optical waveguides and as a result it becomes difficult for the guided mode light to be re-combined with the radiation mode light.

Figure 24:
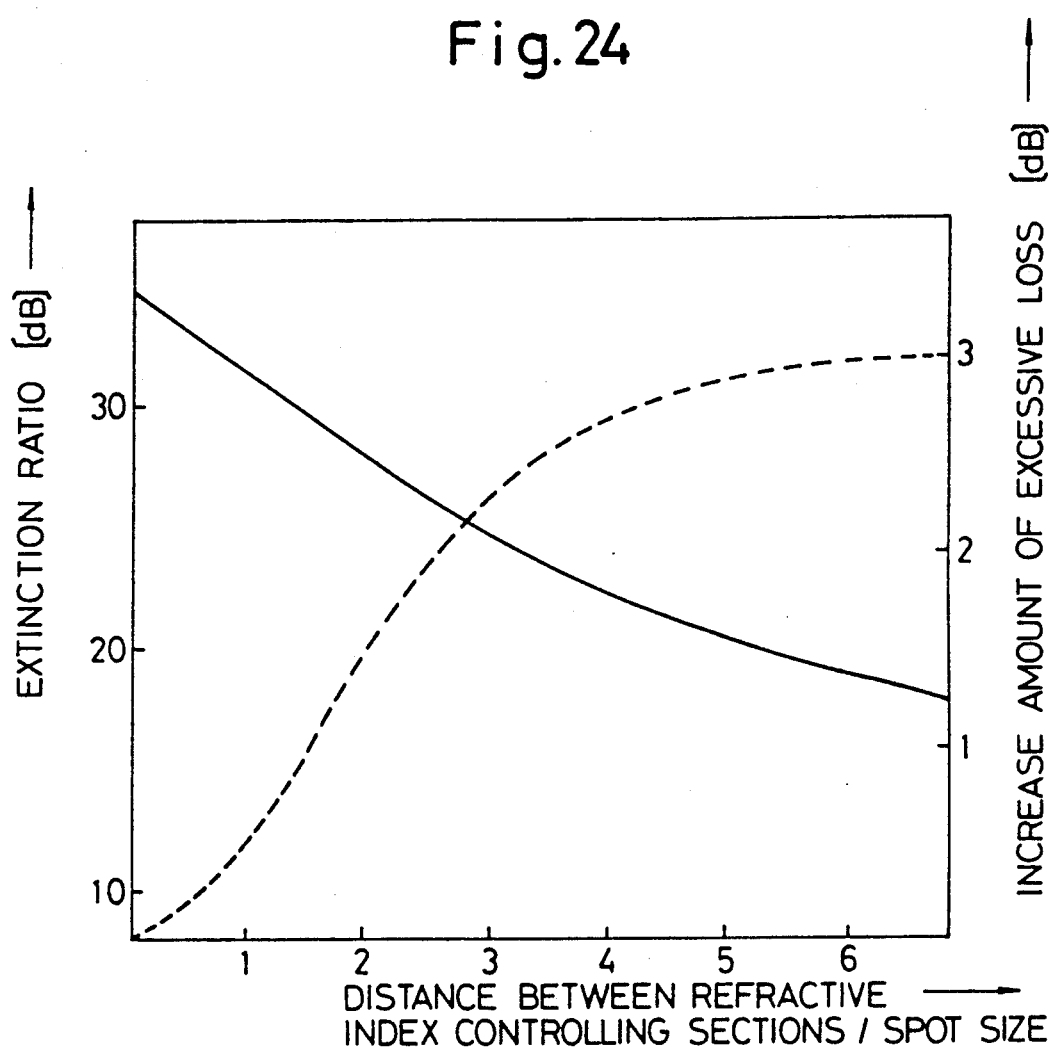
FIG. 24 is a graph showing the correlation between a value obtained by dividing the distance between the refractive index control sections of the Y-junction optical switch by the spot size of light wave propagating along the output optical waveguide and the extinction ratio and an increased amount of excessive loss.

FIG. 24 shows the relation between the distance between the refractive index controlling sections, which distance is divided by the spot size as explained later, the extinction ratio and increase amount of excessive loss, obtained when a light wave is propagated through the output optical waveguide. In FIG. 24, the solid line indicates variation in the extinction ratio and the broken line indicates variation in the increase amount of the excessive loss. The excessive loss used here is defined as an amount of loss exceeding the loss observed in an ideal case of FIG. 22. Further, the spot size is defined as follows.

Figure 25:
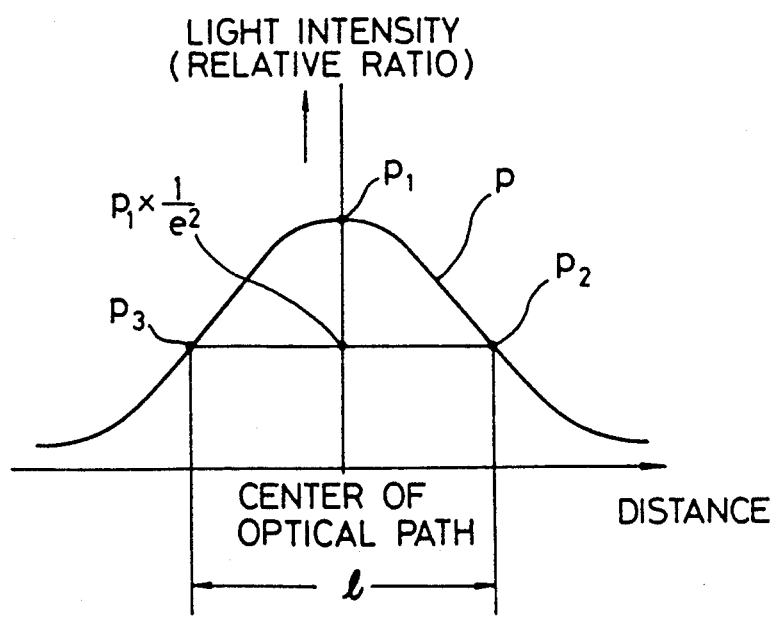
FIG. 25 is a graph showing a curve representing the light intensity distribution on the cross section of an optical path, for explaining the definition of the spot size of the above optical switch.

First, the intensity distribution of light along the cross section of the optical path for the light wave propagated in the branch optical waveguide is drawn by plotting the width of the optical path extending from the center of the optical path along the abscissa and plotting the light intensity along the ordinate. As shown in FIG. 25, a symmetrical light intensity distribution curve p which has a peak value $p_1$ at the center of the optical path and whose light intensity is attenuated in both width directions of the optical path can be obtained.

Two points $p_2$ and $p_3$ ($p_2 = p_3 = p_1 \times 1/e^2$) at which the light intensity is attenuated to $p_1 \times 1/e^2$ (e is the base of the natural logarithms) can be obtained on the curve p. At this time, the width of the optical path indicated by two perpendicular lines drawn from the points $p_2$ and $p_3$ to the abscissa, that is, a distance l indicated in FIG. 25 is defined as twice the spot size. In other words, the spot size is defined as $\frac{1}{2} \times l$.

It is generally said that the extinction ratio is desirably larger than 20 dB. In order to meet the requirement, it is necessary to set the ratio of the distance between the refractive index controlling sections to the spot size smaller than 5 as is clearly seen from FIG. 24. That is, it is necessary to set the distance between the refractive index controlling sections less than five times the spot size.

Further, if the permissible maximum value of the increase amount of the excessive loss is set at 1.5 dB, it becomes necessary to set the distance between the refractive index controlling sections less than twice the spot size as is also clearly seen from FIG. 24.

Therefore, in order to control the degradation degree of the extinction ratio and the increase amount of the excessive loss according to the above values, it is necessary to set the distance between the refractive index controlling sections less than twice the spot size.

In this way, with the optical switch in which the distance between the refractive index controlling sections is set in the above-described manner, the amount of the guided mode light which is re-combined with the radiation mode light is reduced and the extinction ratio can be set larger than 20 dB and the increase amount of the excessive loss can be set less than 1.5 dB.

The distance x between the refractive index controlling sections $C_1$ and $C_2$ of the optical switch shown in FIGS. 20 and 21 is set at 10 $\mu$m. The optical switch of the above construction was used and the spot size of the light wave propagating in the output optical waveguide was set at 5 μm, and the computer simulation of light wave propagation in the output optical waveguides $B_1$ and $B_2$ was effected. In this case, the distance x between the refractive index controlling sections was set at twice the spot size.

Figure 26:
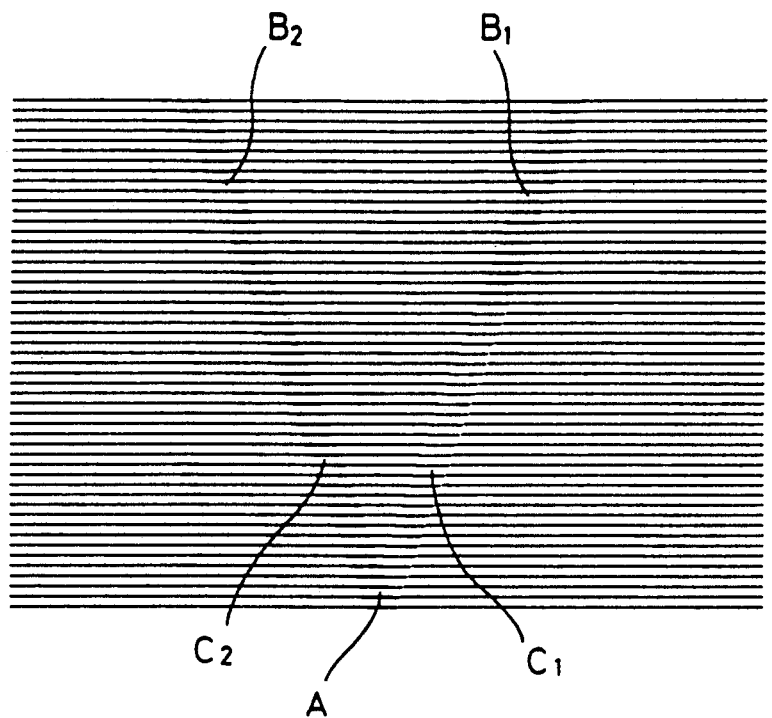
FIG. 26 is a diagram of the refractive index distribution obtained when the refractive index control section $C_1$ of the optical switch shown in FIG. 20 is operated.
Figure 27:
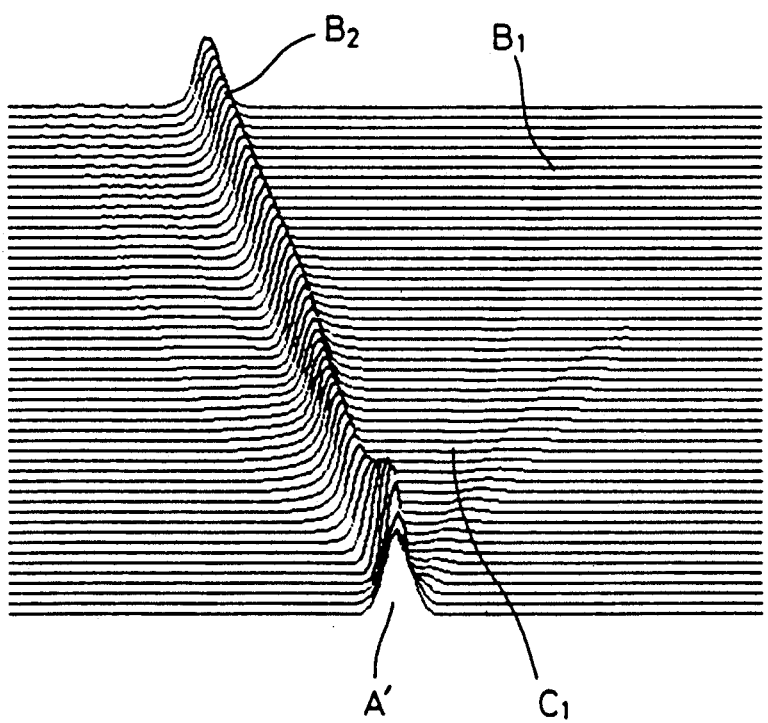
FIG. 27 is a diagram of the light intensity distribution showing the propagation state of the light wave and obtained by computer simulation when the optical switch is set in the state to exhibit the refractive index distribution of FIG. 26.

The results of the computer simulation are shown in FIGS. 26 and 27. FIG. 26 is a diagram showing the refractive index distribution obtained in a case where a current was injected only into the refractive index controlling section $C_1$. As is clearly seen from FIG. 26, the refractive index of the output optical waveguide $B_1$ begins to be reduced immediately behind the branch portion A'. FIG. 27 is a diagram showing the simulation of the propagation state of the light wave propagating in the output optical waveguide $B_2$ while the refractive index controlling section $C_1$ is set in the same condition as in FIG. 26. As is clearly seen from FIG. 27, a favorable propagation state of the light wave was obtained. At this time, the extinction ratio was suppressed to approx. 20 dB and the increase amount of the excessive loss was suppressed to approx. 1.5 dB.

Figure 28:
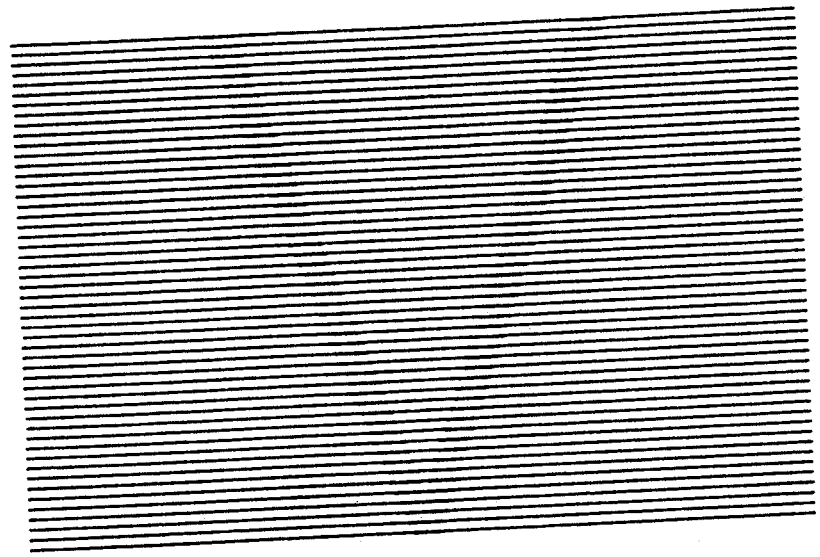
FIG. 28 is a diagram of the refractive index distribution obtained when none of the refractive index control sections $C_1$ and $C_2$ of the optical switch shown in FIG. 20 is operated.
Figure 29:
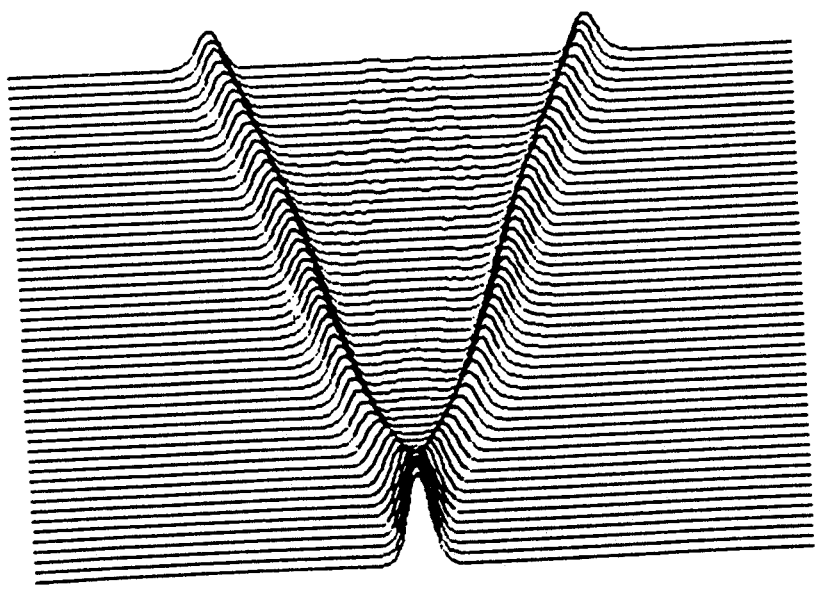
FIG. 29 is a diagram of the light intensity distribution showing the propagation state of the light wave and obtained by computer simulation when the optical switch is set in the state to exhibit the refractive index distribution of FIG. 28.

FIGS. 28 and 29 respectively show the state of the refractive index distribution obtained when none of the refractive index controlling sections $C_1$ and $C_2$ is used and the propagation state of the light wave in each of the branch optical waveguides obtained at this time.

Figure 30:
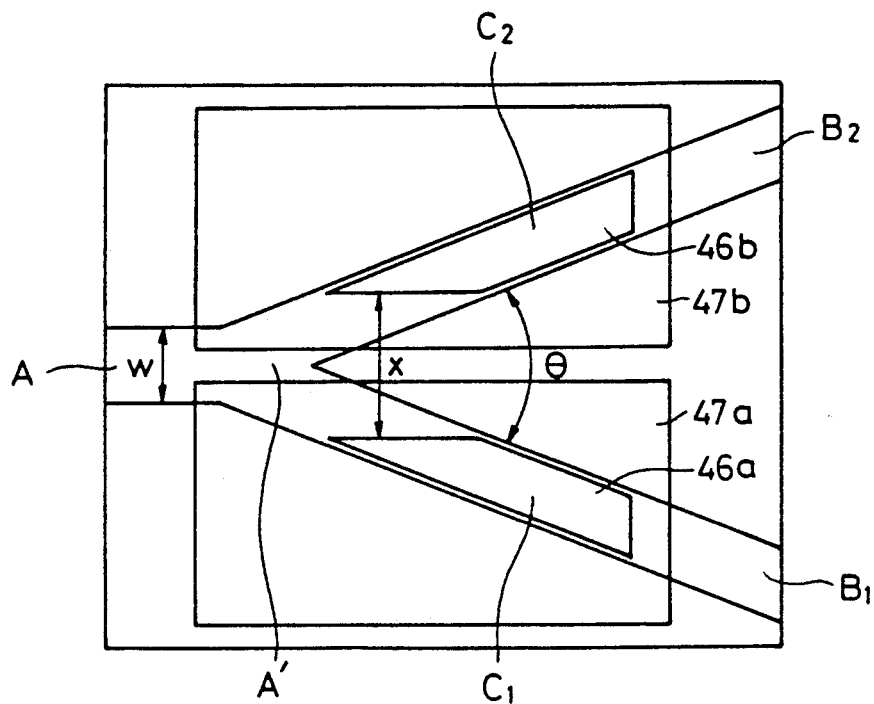
FIG. 30 is a plan view of an optical switch having a distance between the refractive index control sections $C_1$ and $C_2$ set to be larger than that of the optical switch shown in FIG. 20.

Influence on the extinction ratio and the excessive loss due to variation in the distance x between the refractive index controlling sections $C_1$ and $C_2$ was checked. FIG. 30 is a plan view of an optical switch which is formed for comparison with the optical switch of FIGS. 20 and 21 and is similar to the optical switch shown in FIGS. 20 and 21 except that the refractive index controlling sections $C_1$ and $C_2$ are moved to the downstream side and the distance x between the nearest portions of the refractive index controlling sections $C_1$ and $C_2$ is set at 25 μm. In the optical switch of FIG. 30, the distance between the refractive index controlling sections is set to five times the spot size.

The extinction ratio of the optical switch becomes lower than that of the optical switch in which the distance between the refractive index controlling sections is set to twice the spot size and is set to approx. 20 dB. However, increase amount of the excessive loss becomes approx. 3 dB and half the input power is dissipated as a loss.

Figure 31:
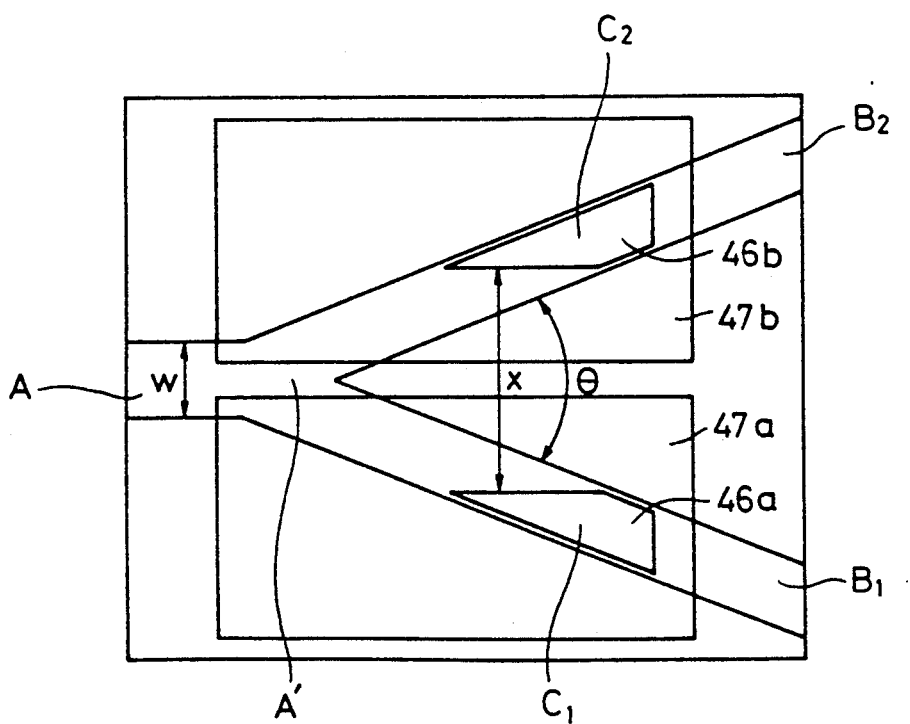
FIG. 31 is a plan view of an optical switch having a distance between the refractive index control sections $C_1$ and $C_2$ set to be larger than that of the optical switch shown in FIG. 30.

FIG. 31 is a plan view of an optical switch which is formed for comparison with the optical switch of FIGS. 20 and 21 and is similar to the optical switch shown in FIGS. 20 and 21 except that the refractive index controlling sections $C_1$ and $C_2$ are further moved to the downstream side and the distance x between the nearest portions of the refractive index controlling sections $C_1$ and $C_2$ is set at 50 μm. In the optical switch of FIG. 31, the distance between the refractive index controlling sections is set to ten times the spot size.

With this optical switch, since the propagating direction of the light wave incident on the branch portion A' is controlled by means of the refractive index controlling sections $C_1$ and $C_2$ after a large portion of the light is distributed to the output optical waveguides $B_1$ and $B_2$, the extinction ratio becomes less than 20 dB and the optical switch cannot be practically used.

The light intensity of the radiation mode light increases as the branch angle $\theta$ becomes larger. Further, the radiation mode light diverges as it propagates along the upper clad layer disposed between the output optical waveguides and therefore the light intensity thereof gradually becomes smaller.

Thus, the light intensity of the radiation mode light is determined depending on the branch angle $\theta$ and the length of the refractive index controlling section disposed on the downstream side of the physical branch point $A_3$.

Figure 32:
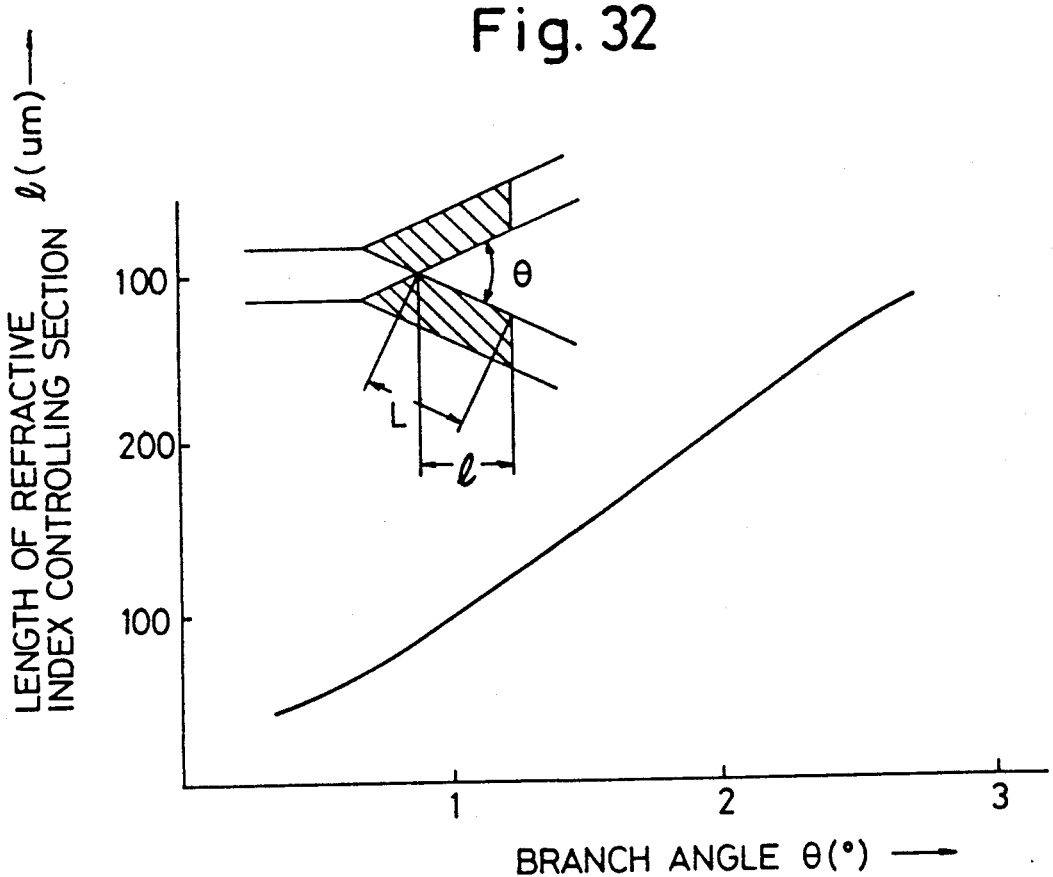
FIG. 32 is a graph showing the relation between the branch angle $\theta$ (°) and the length l ($\mu$m) of the refractive index control section of a Y-junction optical switch with the extinction ratio set at 10 dB.

FIG. 32 shows the correlation between the branch angle $\theta$ and the length l of the refractive index controlling section of one of the output optical waveguides in which the light wave propagation is suppressed under a condition that the specific refractive index difference $\Delta$ is set at 0 to obtain the extinction ratio of 10 dB.

In this case, the specific refractive index difference $\Delta$ indicates a value obtained by dividing a difference between the effective refractive index of the core layer of the refractive index controlling section and the effective refractive index of the core layer lying between the two refractive index controlling sections by the effective refractive index of the above core layer. Further, the length l of the refractive index controlling section indicates a length from the physical branch point $A_3$ to the downstream end portion $C_{1b}$ (or $C_{2b}$) as measured in a direction parallel to a line bisecting the branch angle $\theta$.

Therefore, the relation $l = L \times \cos(\theta/2)$ is obtained between the length l and the actual length L from the physical branch point $A_3$ to the downstream end portion $C_{1b}$ (or $C_{2b}$).

As is clearly seen from FIG. 32, recombination of the radiation mode light can be suppressed and the extinction ratio of more than 10 dB can be obtained by setting the relation $l \geq 100 \times \theta$. That is, when the relation $L \geq 100 \times \theta/\cos(\theta/2)$ is set between the branch angle $\theta$ and the length L of the refractive index controlling section, an optical switch in which degradation of the extinction ratio is suppressed to a minimum can be obtained.

Influence of variation in the length L of the refractive index controlling section on the extinction ratio was checked while the length L was variously changed.

Figure 33:
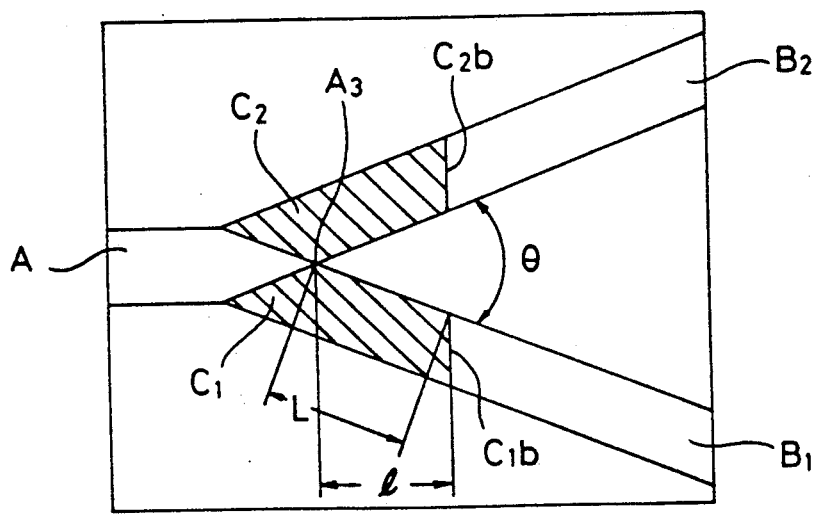
FIGS. 33 to 35 are plan views showing the arrangements of the refractive index control sections when the length l of the refractive index control section is changed with the branch angle $\theta$ kept constant.
Figure 34:
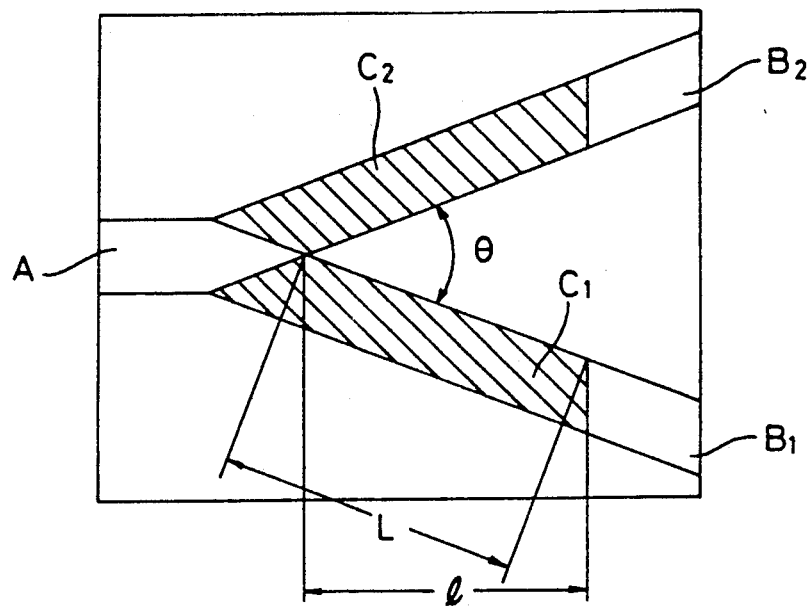
Figure 35:
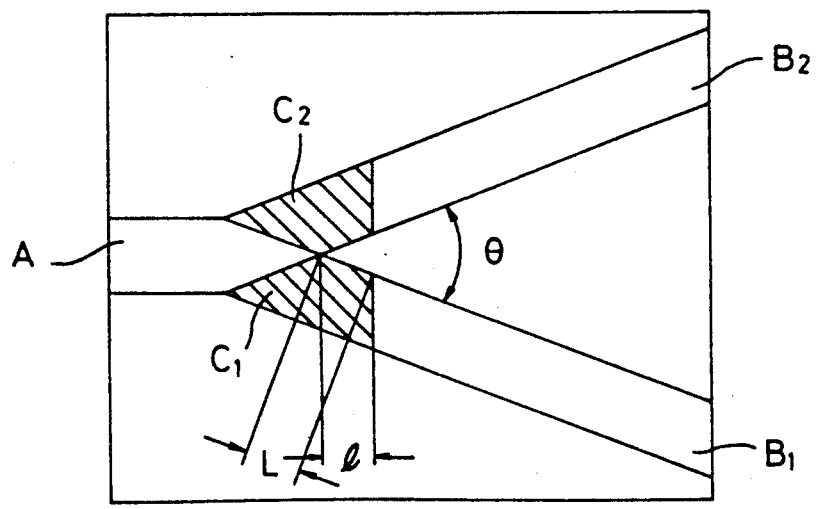

FIG. 33 illustrates an example of a medium length L, FIG. 34 illustrates an example of a sufficiently large length L, and FIG. 35 illustrates an example of an excessively small length L. Symbols, $C_1$, $C_2$, $C_{1b}$, $C_{2b}$, A, $B_1$, $B_2$, $A_3$, $\theta$, L and l indicate the same meanings as mentioned above. FIG. 33 shows an optical switch in which the branch angle $\theta$ is set at 2° and l is set at 200 μm. The length L of the optical switch is $200/\cos 1° = 200.03$ (μm) and is equal to the value of $100 \times \theta/\cos(\theta/2)$.

With the optical switch, the extinction ratio of equal to or larger than 10 dB could be obtained and therefore the optical switch can be applied for the optical exchange or the like.

FIG. 34 shows an optical switch in which the branch angle $\theta$ is kept unchanged and the length l is further increased in comparison with that of the optical switch shown in FIG. 33 and is set to 500 μm. At this time, L is $500/\cos 1° = 500.08$ (μm) and is larger than $100 \times 2/\cos 1° = 200.03$. In this case, the extinction ratio equal to or larger than 20 dB could be obtained.

FIG. 35 is a plan view of an optical switch formed for comparison with the optical switch of the above embodiment in which the branch angle $\theta$ is set at 2° and the length l is set at 50 μm. At this time, the length L of the optical switch is $50/\cos 1° = 50.008$ (μm) and is smaller than the afore-mentioned value of $100 \times 2/\cos 1° = 200.03$ (μm). In this case, significant recombination of the radiation mode light occurred and the extinction ratio of only a few dB could be obtained. Therefore, the optical switch cannot be practically used.

What is claimed is:

1. An optical switch comprising:
   at least one input optical semiconductor waveguide;
   two output optical semiconductor waveguides connected at a branch point to said input optical waveguide and diverging from said branch point with a preset angle $\theta$ (degree) therebetween;
   refractive index controlling means disposed in position on at least one of said output optical waveguides and apart from said branch point, for electrically causing the refractive index of said at least one of said output optical waveguides to be reduced;
   light attenuation means disposed between said two output optical waveguides, for preventing radiation mode light leaked from a portion near said branch point to the outside of said optical waveguide from being re-combined with guided mode light in said output optical waveguide; and
   wherein said light attenuation means includes light scattering means for scattering the leaked radiation mode light.

2. An optical switch comprising:
   at least one input optical semiconductor waveguide;
   two output optical semiconductor waveguides connected at a branch point to said input optical waveguide and diverging from said branch point with a preset angle $\theta$ (degree) therebetween;
   refractive index controlling means disposed in position on at least one of said output optical waveguides and apart from said branch point, for electrically causing the refractive index of said at least one of said output optical waveguides to be reduced;
   light attenuation means disposed between said two output optical waveguides, for preventing radiation mode light leaked from a portion near said branch point to the outside of said optical waveguide from being re-combined with guided mode light in said output optical waveguide; and
   wherein said light attenuation means includes light scattering means for scattering the leaked radiation mode light;
   said output optical waveguides have core portions and a clad portion is provided in common between said core portions, and
   wherein said light scattering means includes an uneven surface pattern formed on that portion of a surface of said clad portion which is located between said core portions.

3. An optical switch comprising:
   at least one input optical semiconductor waveguide;
   two output optical semiconductor waveguides connected at a branch point to said input optical waveguide and diverging from said branch point with a preset angle $\theta$ (degree) therebetween;
   refractive index controlling means disposed in position on at least one of said output optical waveguides and apart from said branch point, for electrically causing the refractive index of said at least one of said output optical waveguides to be reduced;
   light attenuation means disposed between said two output optical waveguides, for preventing radiation mode light leaked from a portion near said branch point to the outside of said optical waveguide from being re-combined with guided mode light in said output optical waveguide;
   wherein said light attenuation means includes light scattering means for scattering the leaked radiation mode light;
   said output optical waveguides have core portions and a clad portion is provided in common between said core portions, and
   said light scattering means includes an uneven surface pattern formed on that portion of a surface of said clad portion which is located between said core portions; and
   wherein said uneven surface pattern is a random pattern.

4. An optical switch comprising:
   at least one input optical semiconductor waveguide;
   two output optical semiconductor waveguides connected at a branch point to said input optical waveguide and diverging from said branch point with a preset angle $\theta$ (degree) therebetween;
   refractive index controlling means disposed in position on at least one of said output optical waveguides and apart from said branch point, for electrically causing the refractive index of said at least one of said output optical waveguides to be reduced;
   light attenuation means disposed between said two output optical waveguides, for preventing radiation mode light leaked from a portion near said branch point to the outside of said optical waveguide from being re-combined with guided mode light in said output optical waveguide;
   wherein said light attenuation means includes light scattering means for scattering the leaked radiation mode light;
   said output optical waveguides have core portions and a clad portion is provided in common between said core portions, and
   wherein said light scattering means includes an uneven surface pattern formed on that portion of a surface of said clad portion which is located between said core portions; and
   wherein said uneven surface pattern is a diffraction grating pattern.

5. An optical switch comprising:
   at least one input optical semiconductor waveguide;
   two output optical semiconductor waveguides connected at a branch point to said input optical waveguide and diverging from said branch point with a preset angle $\theta$ (degree) therebetween; and
   refractive index controlling means disposed in position on at least one of said output optical waveguides and apart from said branch point, for effecting a light mode cut-off by electromagnetically causing a reduction of the refractive index of said at least one of said output optical waveguides;
   wherein said refractive index controlling means is formed with a length from the physical branch point between said two output optical waveguides to an output end portion of said refractive index controlling means set to be not less than $100 \times \theta / \cos(\theta/2)$ μm.

6. An optical switch comprising:
   at least one input optical semiconductor waveguide;
   two output optical semiconductor waveguides connected at a branch point to said input optical waveguide and diverging from said branch point with a preset angle $\theta$ (degree) therebetween; and refractive index controlling means disposed in position on each of said two output optical waveguides and apart from said branch point, for effecting a light mode cut-off by electromagnetically causing a reduction of the refractive index of each of said two output optical waveguides;

wherein a distance between the nearest portions of said refractive index controlling means of said respective output optical waveguides is set to be not larger than twice a spot size which is defined as half a distance indicated by a light intensity distribution curve representing the light intensity distribution along the cross section of the optical path of said output optical waveguides, said distance indicated by the light intensity distribution curve being defined by two points on the light intensity distribution curve at which the light intensity is reduced to $1/e^2$ (e is the base of the natural logarithms) times the peak value thereof.

* * * * *